US012644962B2

(12) United States Patent
Duan et al.

(10) Patent No.: US 12,644,962 B2
(45) Date of Patent: Jun. 2, 2026

(54) BUNDLING OF RADIO FREQUENCY SENSING SIGNALS FOR JOINT SENSING AND DATA COMMUNICATION

(71) Applicant: QUALCOMM Incorporated, San Diego, CA (US)

(72) Inventors: Weimin Duan, San Diego, CA (US); Alexandros Manolakos, Athens (GR); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 18/690,691

(22) PCT Filed: Nov. 2, 2022

(86) PCT No.: PCT/US2022/079186
§ 371 (c)(1),
(2) Date: Mar. 8, 2024

(87) PCT Pub. No.: WO2023/102301
PCT Pub. Date: Jun. 8, 2023

(65) Prior Publication Data
US 2024/0369678 A1      Nov. 7, 2024

(30) Foreign Application Priority Data
Dec. 3, 2021    (GR) ............................... 20210100845

(51) Int. Cl.
*G01S 7/35*          (2006.01)
*G01S 13/00*         (2006.01)
*H04W 92/18*         (2009.01)
(52) U.S. Cl.
CPC ............ *G01S 7/354* (2013.01); *G01S 13/003* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2,542,182 A | * | 2/1951 | Crump | .................... G01S 13/86 375/216 |
| 4,291,309 A | * | 9/1981 | Spiller | .................... G01S 13/86 342/60 |

(Continued)

OTHER PUBLICATIONS

International Search Report and Written Opinion—PCT/US2022/079186—ISA/EPO—Feb. 2, 2023.

*Primary Examiner* — Bernarr E Gregory
(74) *Attorney, Agent, or Firm* — QUALCOMM Incorporated

(57) ABSTRACT
Methods, systems, and devices for joint sensing and data communication. A first sensing signal and a second sensing signal are transmitted in sequence, from a transmitter and using the same carrier frequency, for combined processing by a receiver. In some implementations, the sensing signals are radar signals. Data communication during an intervening time period between the first sensing signal and the second sensing signal involves the transmitter sending a data communication signal to another device or vice versa. Phase continuity between the first sensing signal and the second sensing signal can be maintained through performing radio frequency (RF) tuning on the transmitter after the transmitter transmits the data communication signal. The RF tuning may involve storing and restoring an operating state of a power amplifier in the transmitter. Alternatively, phase continuity can be maintained through preventing the transmitter from transmitting over an entirety of the intervening time period.

30 Claims, 15 Drawing Sheets

(56)                    References Cited

U.S. PATENT DOCUMENTS

| | | | | |
|---|---|---|---|---|
| 4,733,238 A * | 3/1988 | Fiden | ........................ | G01S 7/006 342/60 |
| 4,866,447 A * | 9/1989 | Loucks | .................... | G01S 7/006 342/60 |
| 5,093,663 A * | 3/1992 | Baechtiger | .............. | G01S 7/006 342/60 |
| 5,917,430 A * | 6/1999 | Greneker, III | ... | G08G 1/096716 340/936 |
| 5,995,984 A * | 11/1999 | Lau | ........................ | G06F 3/0481 715/219 |
| 7,298,313 B1 * | 11/2007 | Fiden | ........................ | G01S 7/006 342/57 |
| 7,423,577 B1 * | 9/2008 | McIntire | ................. | G01S 7/006 375/295 |
| 7,570,196 B1 * | 8/2009 | Mower | .................... | G01S 7/006 342/159 |
| 7,978,610 B1 * | 7/2011 | McIntire | ........... | H04W 56/0065 370/278 |
| 8,730,088 B2 * | 5/2014 | Milligan | ................. | G01S 7/006 342/52 |
| 11,375,543 B2 * | 6/2022 | Sanderovich | ........... | G01S 7/023 |
| 11,892,554 B2 * | 2/2024 | Xu | ......................... | G01S 13/931 |
| 2007/0139253 A1 * | 6/2007 | Meyers | .................... | G01S 7/006 342/60 |
| 2008/0170559 A1 * | 7/2008 | Zumsteg | ............... | G01S 13/003 370/350 |
| 2014/0035774 A1 * | 2/2014 | Khlifi | ...................... | G01S 7/006 342/21 |
| 2017/0214746 A1 | 7/2017 | Zettler et al. | | |
| 2018/0031673 A1 | 2/2018 | Kim et al. | | |
| 2020/0132810 A1 | 4/2020 | Subburaj et al. | | |
| 2021/0003661 A1 | 1/2021 | Xu et al. | | |

* cited by examiner

100

Target 106

User
Equipment
(UE)
105

133

135

130

120

Network
170

160
Radar Server

180

External Client

1200

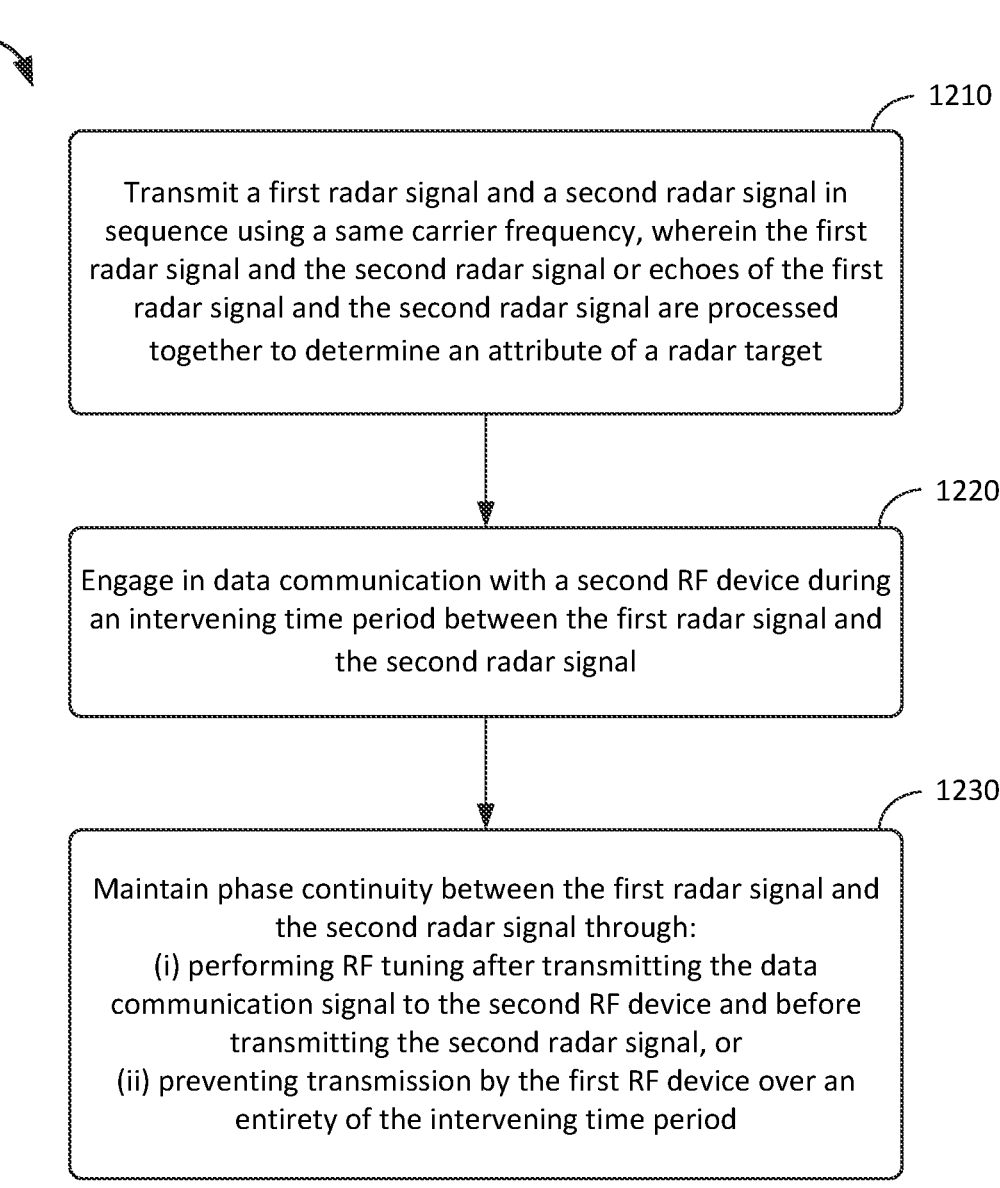

1210

Transmit a first radar signal and a second radar signal in sequence using a same carrier frequency, wherein the first radar signal and the second radar signal or echoes of the first radar signal and the second radar signal are processed together to determine an attribute of a radar target

1220

Engage in data communication with a second RF device during an intervening time period between the first radar signal and the second radar signal

1230

Maintain phase continuity between the first radar signal and the second radar signal through:
(i) performing RF tuning after transmitting the data communication signal to the second RF device and before transmitting the second radar signal, or
(ii) preventing transmission by the first RF device over an entirety of the intervening time period

BUNDLING OF RADIO FREQUENCY SENSING SIGNALS FOR JOINT SENSING AND DATA COMMUNICATION

RELATED APPLICATIONS

This application is a National Phase entry of International Application No. PCT/US2022/079186, filed Nov. 2, 2022, entitled "BUNDLING OF RADIO FREQUENCY SENSING SIGNALS FOR JOINT SENSING AND DATA COMMUNICATION", which claims the benefit of Greek application No. 20210100845, filed Dec. 3, 2021, entitled "BUNDLING OF RADIO FREQUENCY SENSING SIGNALS FOR JOINT SENSING AND DATA COMMUNICATION", both of which are assigned to the assignee hereof, and incorporated herein in their entirety by reference.

BACKGROUND

1. Field of Disclosure

The present disclosure relates generally to the field of wireless communications and bundling of radio frequency (RF) signals used for sensing, for example, radar signals. In particular, aspects of the present disclosure relate to transmission of multiple RF sensing signals together with transmission of one or more communications signals, where the RF sensing signals are bundled for combined processing to sense an object such as a radar target.

2. Description of Related Art

Wireless communications systems, such as cellular communication systems, transmit data between RF devices. Due to increasing quantity of data to be transmitted, the frequency bandwidth allocated for data transmission is expected to also increase in order to meet latency and/or other performance requirements of wireless communication systems that are based on radio access technologies (RATs) such as Fifth Generation (5G) New Radio (NR), Six Generation (6G), and beyond. Some wireless devices are capable of performing both RF sensing (e.g., using a radar signal) and data communication. For example, in the context of cellular communication, a User Equipment (UE) may, in addition to transmitting and/or receiving radar signals, also transmit uplink (UL) data, receive downlink (DL) data, or be involved in sidelink (SL) communication with another UE.

When transmitting multiple RF signals, modulation and/or multiplexing schemes, such as orthogonal frequency-division multiplexing (OFDM), are sometimes used to prevent or minimize inter-signal interference. In some instances, it is desirable to transmit multiple RF sensing signals for combined processing by an RF receiver. Such combined processing can be challenging in a multi-signal environment that includes not only multiple RF sensing signals but also signals used for data communication or other purposes.

BRIEF SUMMARY

Methods, systems, and devices for joint sensing and data communication. A first sensing signal and a second sensing signal are transmitted in sequence, from a transmitter and using the same carrier frequency, for combined processing by a receiver. In some implementations, the sensing signals are radar signals. Data communication during an intervening time period between the first sensing signal and the second sensing signal involves the transmitter sending a data communication signal to another device or vice versa. Phase continuity between the first sensing signal and the second sensing signal can be maintained through performing radio frequency (RF) tuning on the transmitter after the transmitter transmits the data communication signal. The RF tuning may involve storing and restoring an operating state of a power amplifier in the transmitter. Alternatively, phase continuity can be maintained through preventing the transmitter from transmitting over an entirety of the intervening time period.

According to certain aspects, a method performed by a first RF device involves transmitting a first radar signal and a second radar signal in sequence using a same carrier frequency, where the first radar signal and the second radar signal or echoes of the first radar signal and the second radar signal are processed together to determine an attribute of a radar target. The method further involves engaging in data communication with a second RF device during an intervening time period between the first radar signal and the second radar signal. The engaging in data communication with the second RF device involves transmitting a data communication signal to the second RF device or receiving the data communication signal from the second RF device. The method further involves maintaining, by the first RF device, phase continuity between the first radar signal and the second radar signal. The maintaining of phase continuity may involve: (i) performing RF tuning after transmitting the data communication signal to the second RF device and before transmitting the second radar signal, or (ii) preventing transmission by the first RF device over an entirety of the intervening time period.

According to certain aspects, a first RF device includes a transceiver and one or more processing units communicatively coupled to the transceiver. The transceiver is configured to transmit a first radar signal and a second radar signal in sequence using a same carrier frequency, where the first radar signal and the second radar signal or echoes of the first radar signal and the second radar signal are processed together to determine an attribute of a radar target. The one or more processing units are configured to engage in data communication with a second RF device through the transceiver and during an intervening time period between the first radar signal and the second radar signal. The data communication with the second RF device involves transmitting a data communication signal to the second RF device or receiving the data communication signal from the second RF device. The one or more processing units are further configured to maintain phase continuity between the first radar signal and the second radar signal. To maintain phase continuity, the one or more processing units are configured to: (i) perform RF tuning on the transceiver after the transceiver transmits the data communication signal to the second RF device and before the transceiver transmits the second radar signal, or (ii) prevent transmission by the transceiver over an entirety of the intervening time period.

According to certain aspects, a device may include means for performing any of the above methods.

According to certain aspects, a non-transitory computer-readable medium may have instructions stored thereon. When executed by one or more processing units of an RF device, the instructions cause the RF device to perform any of the above methods.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 12 is a flow diagram of a method of maintaining phase continuity between a pair of bundled radar signals, according to an embodiment.

Figure 1:
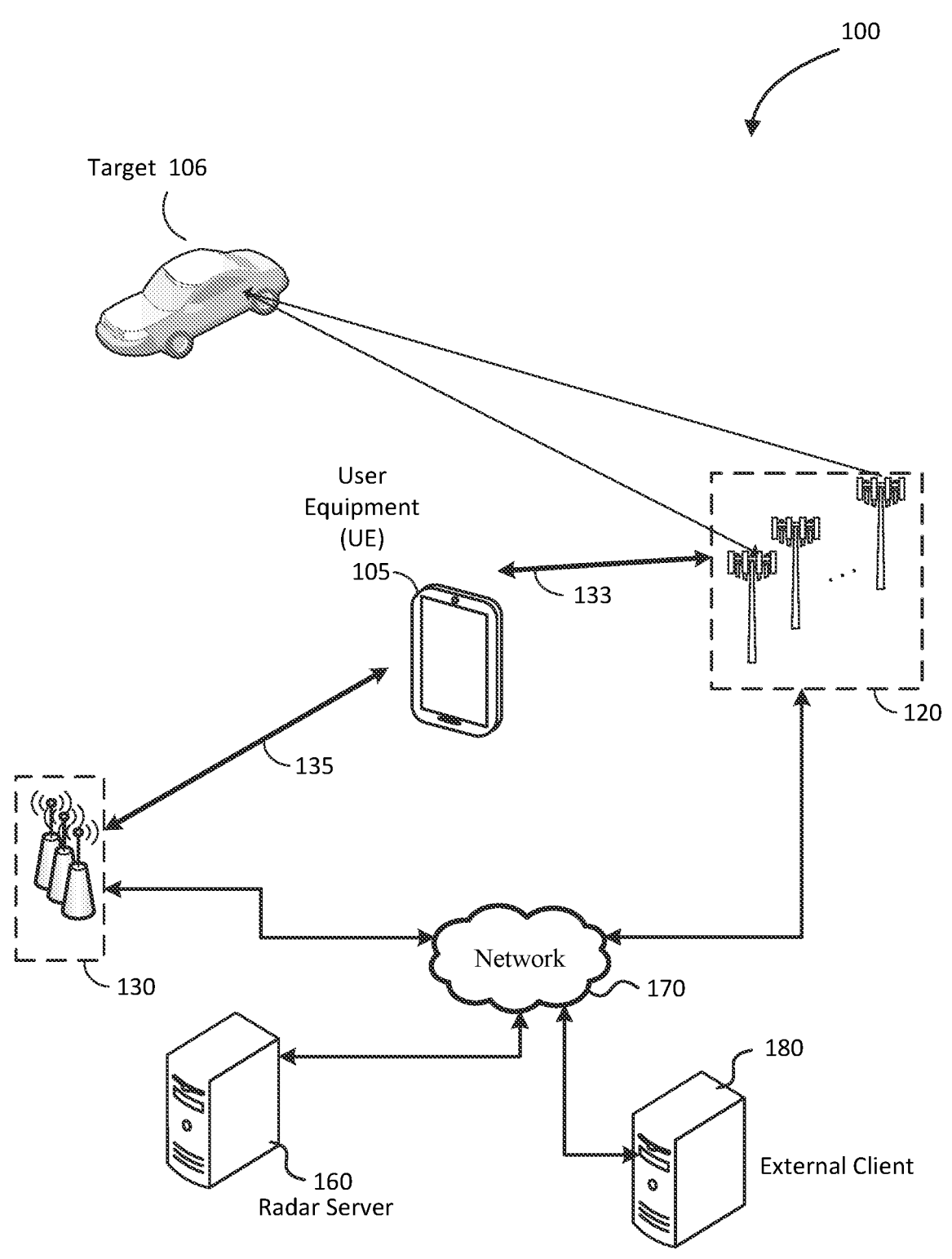
FIG. 1 is a simplified diagram of an example of a wireless system in which two or more base stations may be used to perform bistatic or multistatic radar operations according to certain embodiments.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

As used herein, a "reference signal" or "RS" may refer to an RF signal used for sensing objects in the environment. For example, a radar reference signal ("radar RS" or simply "radar signal") can be an RF signal transmitted in a monostatic, bistatic, or multistatic radar system for purposes of estimating parameters/attributes of a radar target. Additionally, a reference signal may, in some instances, refer to an RF signal used for data communication or other purposes. Such reference signals can include, for example, a Channel State Information Reference Signal (CSI-RS), a synchronization signal (e.g., Synchronization Signal Block (SSB)), a Positioning Reference Signal (PRS), or a Sounding Reference Signal (SRS). The terms "RF sensing signal" and "sensing signal" are used herein to distinguish RF signals used for sensing from RF signals used for data communication or other purposes.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT,"

a "client device," a "wireless device," a "subscriber device," a "subscriber terminal," a "subscriber station," a "user terminal" (or UT), a "mobile device," a "mobile terminal," a "mobile station," or variations thereof.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

RF sensing signals can be bundled for processing. For example, a pair of radar signals (radar RSs) may be sequentially transmitted by a radar transmitter, and a radar receiver may use both radar RSs to estimate one or more common (shared) parameters of a radar target based on receiving reflections (echoes) of the radar RSs off the radar target. In order to facilitate combined processing of sensing signals by the receiver, phase continuity between the sensing signals should be maintained. Each sensing signal may be generated by modulating a baseband signal with a carrier signal that has a specific phase associated with it. When estimating target velocity based on Doppler frequency or performing other sensing operations, it is sometimes beneficial to have a relatively long measurement gap between sensing signals. Accordingly, there may be a delay between when the receiver expects to receive a first sensing signal and when the receiver expects to receive a second sensing signal that is bundled with the first sensing signal. Maintaining phase continuity between the first sensing signal and the second sensing signal over the duration of the measurement gap can be challenging. In this regard, phase continuity means that the phases associated with the received waveforms are continuous rather than discrete, so that there are no or minimal jumps in phase between one waveform and the next. However, phase continuity does not require that the phases associated with the first sensing signal and the second sensing signal be identical. For example, the radar transmitter may be configured to ramp up the phase of a carrier signal according to a continuous function (e.g., linearly) over time.

Maintaining phase continuity is especially difficult when non-sensing signals (e.g., signals used for uplink, downlink, or sidelink communication) are transmitted between consecutive instances of bundled sensing signals. For example, due to differences between power requirements of a sensing signal and a non-sensing signal, a power amplifier (PA) of a radar transmitter may change from a first state when amplifying a sensing signal to a second state when amplifying a non-sensing signal. The first state and the second state may each have a different gain and a different phase associated with it. If another sensing signal is transmitted after the non-sensing signal, the transmitter should ideally be able to restore phase continuity relative to the earlier sensing signal. Techniques for maintaining phase continuity between sensing signals (e.g., two or more radar RSs) will be described below after an initial description of relevant systems and technologies. Illustrative embodiments are described with respect to radar sensing. However, the described embodiments can be applied to sensing involving other types of RF signals.

FIG. 1 is a simplified illustration of a cellular communication system 100 in which two or more base stations 120 may be used to perform bistatic or multistatic radar operations to sense one or more targets 106, according to one or more embodiments of the present disclosure. Cellular communication system 100 may comprise a UE 105, base stations 120, access points (APs) 130, a radar server 160, a network 170, an external client 180, and/or other components. In the example of FIG. 1, the radar transmitter(s) include one or more of the base stations 120. However, a radar transmitter can be any radar-equipped system or device and may include, for example, the UE 105. Likewise, a radar receiver can be a base station 120, the UE 105, or some other radar-equipped entity.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the cellular communication system 100. Similarly, the cellular communication system 100 may include a larger or smaller number of base stations 120 and/or APs 130 than illustrated in FIG. 1. The illustrated connections that connect the various components in the cellular communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to radar server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), a Transmission Reception Point (TRP), or the like. A base station 120 that is a gNB or ng-eNB may be part of a Next Generation Radio Access Network (NG-RAN) which may connect to a 5G Core Network (5GCN) in the case that the network 170 is a 5G network.

A base station 120 may operate according to one of several RATs in communication with UEs depending on the network in which it is deployed. A base station 120 may be used primarily to support wireless access by UEs, including supporting data, voice, and/or signaling connections for the supported UEs. In some systems, a base station 120 may provide purely edge node signaling functions, while in other systems, a base station 120 may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

An AP 130 may comprise a Wi-Fi AP or a Bluetooth® AP, for example. Thus, UE 105 can send and receive information with network-connected devices, such as radar server 160, by accessing the network 170 via a base station 120 using a first communication link 133. Additionally or alternatively, because APs 130 also may be communicatively coupled with the network 170, UE 105 may communicate with Internet-connected devices, including radar server 160, using a second communication link 135.

The radar server 160 may operate in a manner akin to a location server, in that the radar server may coordinate and manage radar operations within cellular communication system 100, much like a location server coordinates and manages positioning operations within a cellular communication system. Radar server 160 may be a combination of hardware and/or software resources that reside within a wireless communications network and, in some, implementations, may be part of network 170. Thus, the radar server may be defined as a functional block, facility, or node that serves to, for example, configure and/or control parameters relied upon by base stations or other entities involved in radar operations.

Figure 2:
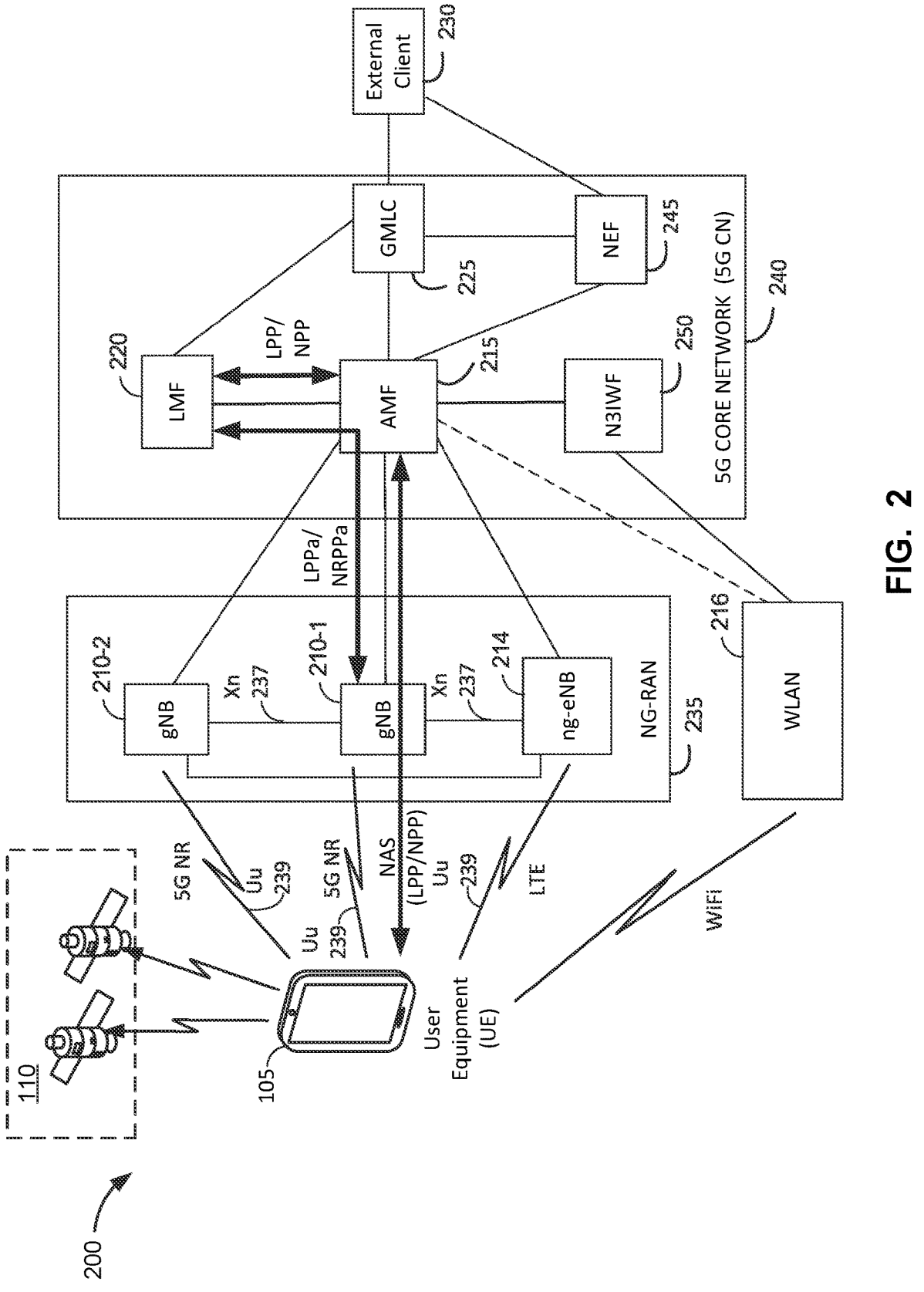
FIG. 2 is a simplified diagram of a Fifth Generation (5G) New Radio (NR) system that may be used to implement certain embodiments.

FIG. 2 shows a diagram of a 5G NR cellular communication system 200, which may be an embodiment of cellular communication system 100 implementing 5G NR. In addition to the radar-related functionality described below, the 5G NR cellular communication system 200 may, in some instances, operate as a positioning system configured to determine the location of a UE 105 by using access nodes 210, 214, 216 (which may correspond with base stations 120 and access points 130 of FIG. 1) and (optionally) an LMF 220 (which may correspond with radar server 160 or a separate location server) to implement one or more positioning methods. In FIG. 2, the 5G NR cellular communication system 200 comprises the UE 105, and components of a 5G NR network comprising an NG-RAN 235 and a 5G CN 240. A 5G network may also be referred to as an NR network; NG-RAN 235 may be referred to as a 5G RAN or as an NR RAN; and 5G CN 240 may be referred to as an NG Core network. The 5G NR cellular communication system

200 may optionally utilize information from Global Navigation Satellite System (GNSS) satellites 110 of a GNSS system like the Global Positioning System (GPS) or a similar system (e.g. GLONASS, Galileo, Beidou, Indian Regional Navigational Satellite System (IRNSS)) for positioning purposes. Additional components of the 5G NR cellular communication system 200 are described below. The 5G NR cellular communication system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR cellular communication system 200. Similarly, the 5G NR cellular communication system 200 may include a larger (or smaller) number of GNSS satellites 110, gNBs 210, ng-eNBs 214, Wireless Local Area Networks (WLANs) 216, Access and Mobility Functions (AMF) s 215, external clients 230, and/or other components. The illustrated connections that connect the various components in the 5G NR cellular communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., a Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR cellular communication system 200, such as the LMF 220 and AMF 215.

5G NR cellular communication system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations.

However, access nodes providing the functionality described herein may additionally or alternatively include entities enabling communications to any of a variety of RATs not illustrated in FIG. 2, which may include non-cellular technologies. Thus, the term "access node," as used herein, may include but is not necessarily limited to a gNB 210, ng-eNB 214 or WLAN 216.

While FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response to the external client 230. The GMLC 225 is shown connected to both the AMF 215 and LMF 220 in FIG. 2 though only one of these connections may be supported by 5G CN 240 in some implementations.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using the LPPa protocol (which also may be referred to as NRPPa or NPPa) as defined in 3GPP Technical Specification (TS) 38.445. LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using an LPP protocol as defined in 3GPP TS 37.355. Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

Figure 3:
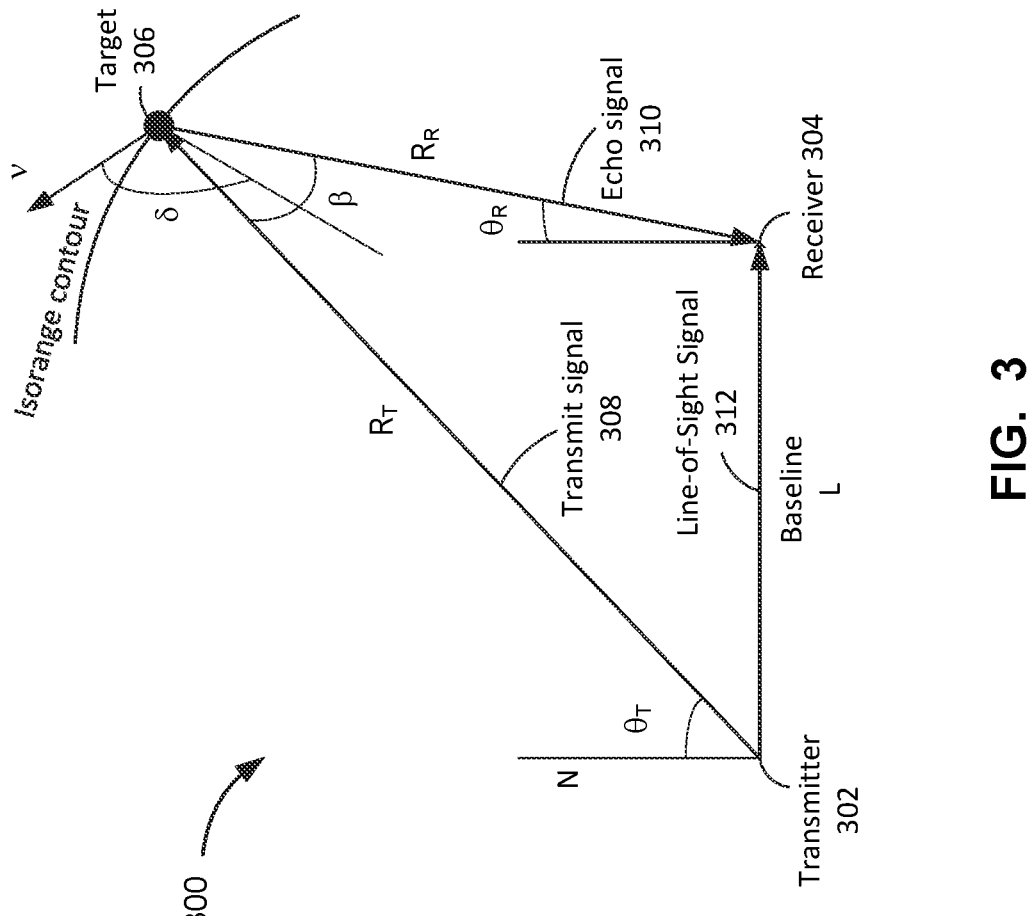
FIG. 3 is a simplified diagram illustrating the operation of a bistatic radar system.

FIG. 3 is a simplified diagram illustrating the operation of a bistatic radar system 300. A transmitter 302 and a receiver 304 are used to send and receive radar signals respectively for sensing a target 306. While a bistatic radar example is shown, the same principals of operation can be applied to a multistatic radar, which utilizes more than two transmitter(s) and/or receiver(s). For example, a multistatic radar may utilize one transmitter and two receivers. In another example, a multistatic radar may utilize two transmitters and one receiver. Larger numbers of transmitters and/or receivers may also be used in some embodiments.

In bistatic radar system 300, transmitter 302 may send a transmit signal 308 that traverses a distance Rr to reach target 306. Transmit signal 308 may reflect from target 306 and becomes an echo signal 310 that traverses a distance RR to reach receiver 304. A primary function served by bistatic radar system 300 is sensing the range, or distance RR, from target 306 to receiver 304. The system determines the range RR primary by sensing the amount of time taken for the transmit signal 308 and echo signal 310 to traverse the total distance $R_{sum}$, which is the sum of RT and RR:

$$R_{sum} = R_T + R_R \qquad \text{(Eq. 1)}$$

The total distance $R_{sum}$ defines an ellipsoid surface (also known as the iso-range contour) with foci at the locations of transmitter 302 and receiver 304, respectively. The ellipsoid surface represents all the possible locations of target 306, given the total distance $R_{sum}$. Bistatic radar system 300 is capable of measuring the distance $R_{sum}$. For example, if transmitter 302 and receiver 304 are synchronized (which is not required as described below), the time duration $T_{sum}$ between the moment when transmitter 302 sent transmit signal 308 and the moment when receiver 304 received echo signal 310 may be determined. Multiplying the time duration $T_{sum}$ by the speed of the signal in free space, e.g., approximately $c=3\times10^8$ meters/second, yields $R_{sum}$. Thus, the ellipsoid surface of all possible locations of target 306 can be found by measuring the "flight time" $T_{sum}$ of the bistatic radar signal.

In some implementations, the distance $R_{sum}$ can be measured without tight time synchronization between transmitter 302 and receiver 304. Synchronization can be avoided by sending a line-of-sight (LOS) signal 312 from transmitter 302 to receiver 304 at the same time when transmitter 302 sends transmit signal 308 toward target 306. In one implementation, transmit signal 308 may correspond to a main lobe of a transmit antenna beam pattern emitted from transmitter 302, while LOS signal 312 may correspond to a side lobe of the same transmit antenna beam pattern emitted from transmitter 302. In other implementations, transmit signal 308 and LOS signal 312 may be arranged in other manners.

Receiver 304 may receive both echo signal 310 and LOS signal 312, and can then utilize the timing of the reception of these two signals to measure the total distance $R_{sum}$, using the expression:

$$R_{sum} = \left(T_{Rx\_echo} - T_{Rx_{LOS}}\right) \times c + L, \qquad \text{(Eq. 2)}$$

where $T_{Rx\_echo}$ is the time of reception of echo signal 310, $T_{RxLOS}$ is the time of reception of LOS signal 312, c is the speed of the signal in free space, and L is the distance between transmitter 302 and receiver 304. Once $R_{sum}$ is determined, it can be used to calculate the target range RR between target 306 and receiver 304 using the following expression:

$$R_R = \frac{R_{sum}^2 - L^2}{2(R_{sum} + L \times \sin\theta_R)} \quad \text{(Eq. 3)}$$

Bistatic radar system 300 can also be used to determine the angle of arrival (AoA) $\theta_R$ at which echo signal 310 is received by receiver 304. This can be done in various ways. One way is to estimate OR by using an antenna array at receiver 304. An antenna array, which comprises multiple antenna elements, can be operated as a programmable directional antenna capable of sensing the angle at which a signal is received. Thus, receiver 304 may employ an antenna array to sense the angle of arrival of echo signal 310. Another way to estimate $\theta_R$ involves multilateration. Multilateration refers to the determination of the intersection of two or more curves or surfaces that represent possible locations of a target. For example, bistatic radar system 300 shown in FIG. 3 can define a first ellipsoid surface representing possible locations of target 306, as described previously. A second bistatic radar system with a differently located transmitter and/or receiver can define a second, different ellipsoid surface that also represents the possible locations of target 306. The intersections of the first ellipsoid surface and the second ellipsoid surface may correspond to the possible locations of target 306. In a three-dimensional space, four such ellipsoid surfaces may generally be needed to reduce the possible location to a single point, thus identifying the location of target 306. In a two-dimensional space (e.g., assuming all transmitters, receivers, and the targets are on the ground), three such ellipsoid surfaces (for two-dimensional space, the ellipsoid surfaces reduce to elliptical curves) would generally be needed to reduce the possible locations to a single point, thus identifying the location of target 306. Multilateration can also be achieved in a similar manner using a multistatic radar system instead of multiple bistatic radar systems.

Furthermore, bistatic radar system 300 can also be used to determine the Doppler frequency associated with target 306. The Doppler frequency denotes the relative velocity of target 306 from the perspective of receiver 304 (the velocity at which target 306 is approaching or moving away from receiver 304). For a stationary transmitter 302 and a stationary receiver 304, the Doppler frequency of target 306 can be calculated as:

$$f_D = \frac{2v}{c} \times \cos\delta \times \cos(\beta/2) \quad \text{(Eq. 4)}$$

Here, $f_D$ is the Doppler frequency, v is the velocity of target 306 relative to a fixed frame of reference defined by stationary transmitter 302 and receiver 304. $\beta$ is the angle formed between transmit signal 308 and echo signal 310 at the target 306. $\delta$ is the angle between the velocity vector v and the center ray (half angle) defined within angle $\beta$.

In FIG. 3, a fixed frame of reference is defined with respect to stationary transmitter 302 and stationary receiver 304. Specifically, a baseline of length L can be drawn between transmitter 302 and receiver 304. The baseline can be extended beyond transmitter 302 and receiver 304. One or more normal lines can be drawn as being perpendicular to the baseline. A transmit angle $\theta_T$ can be defined relative to a normal line drawn from the location of transmitter 302. A receive angle $\theta_R$, referred to above as the angle of arrival, can be defined relative to a normal line drawn from the location of receiver 304.

As mentioned previously, bistatic radar system 300 can be operated to sense a target in a two-dimensional space or a three-dimensional space. An additional degree of freedom is introduced in the case of three-dimensional space. However, the same basic principles apply, and analogous calculations may be performed.

Figure 4:
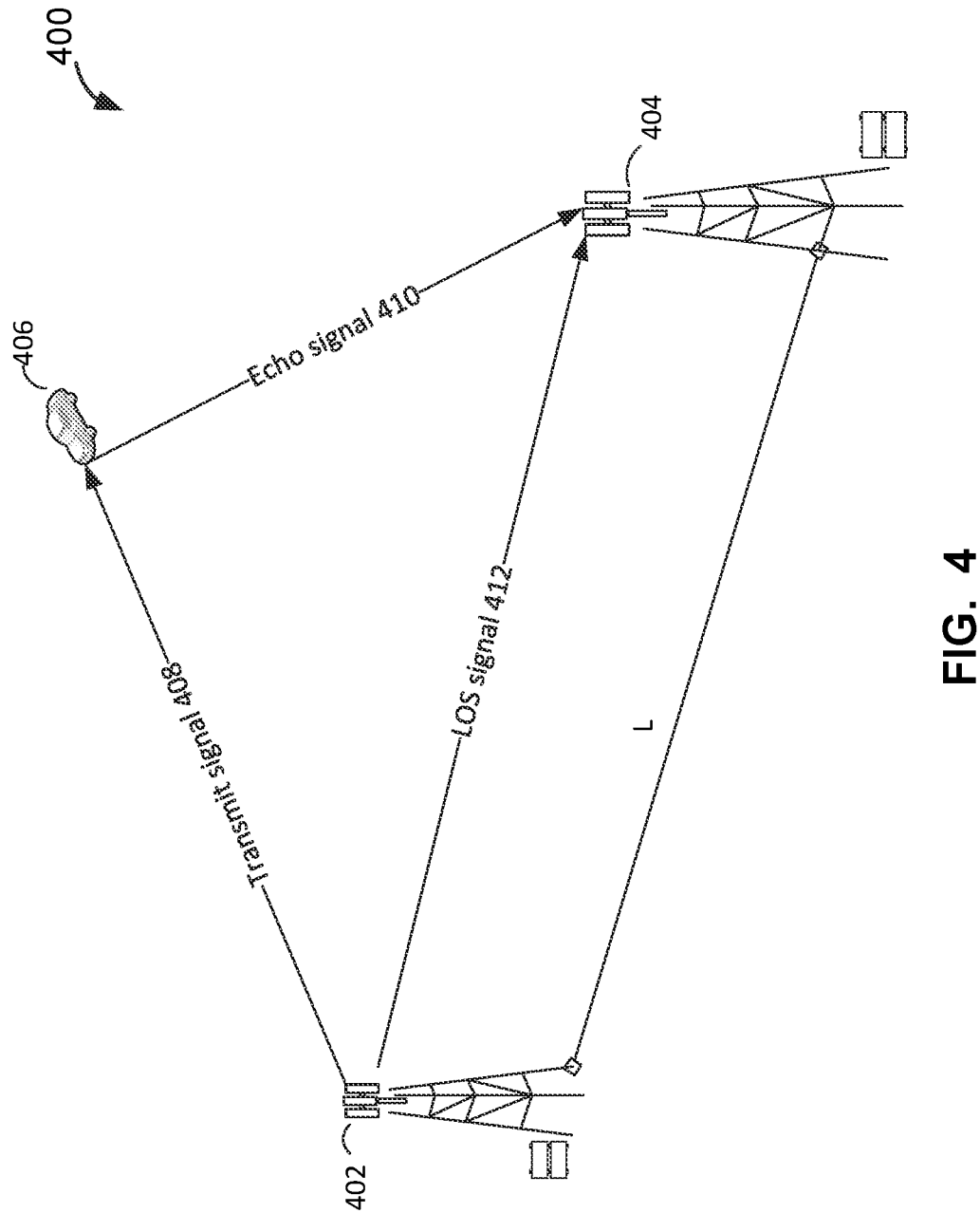
FIG. 4 illustrates an example of an implementation of a bistatic radar system in a wireless communication system, according to certain embodiments.

FIG. 4 illustrates an example of an implementation of a bistatic radar system 300 in a wireless communication system 400, according to certain embodiments. Wireless communication system 400 may include numerous Transmission Reception Point (TRPs), which perform signal transmission and/or reception with other devices. Examples of TRPs within wireless communication system 400 include base stations 402 and 404, which may serve to provide wireless communications for UE, such as vehicles, wireless phones, wearable device, personal access points, and a plethora of other types of user devices in the vicinity that are capable of wireless data communications. For instance, base stations 402 and 404 may be configured to support data communications with a UE, by transmitting data symbols to or receiving data symbols from the UE. Resources within wireless communication system 400, such as base stations 402 and 404, may thus be utilized to serve "double duty" to support not only wireless communication operations but also bistatic and/or multistatic radar operations. Wireless communication system 400 may be a cellular communication system.

For example, base stations 402 and base station 404 may serve as the transmitter 302 and receiver 304, respectively, of bistatic radar system 300 shown in FIG. 3. Base station 402 may transmit a transmit signal 408, which may reflect from target 406 and becomes an echo signal 410 received by base station 404. Base station 404 may also receive an LOS signal 412 from base station 402. By receiving both LOS signal 412 and echo signal 410, base station 404 can measure the value associated with the time difference between reception times $T_{Rx\_echo}$ and $T_{RxLOS}$ associated with the reception of LOS signal 412 and echo signal 410, respectively. For example, base station 404 may cross-correlate the received LOS signal 412 with the received echo signal 410, such as by mixing the two signals in analog or digital form, to yield a value representative of the time difference ($T_{Rx\_echo}-T_{RxLOS}$). The time difference can be used to find the total distance $R_{sum}$. The total distance $R_{sum}$ can then be used to define an ellipsoid surface, which along with other information may be used to determine one or more attributes of the target 406, including the target range RR, angle of arrival (AoA) OR, and/or Doppler frequency associated with the target 406, using one or more techniques discussed above with respect to FIG. 3.

In some instances, target 406 may be a UE that is supported by wireless communication system 400. For example, target 406 may be a UE that is configured to transmit and receive RF signals carrying voice, text, and/or wireless data using the base stations of wireless communication system 400. In other instances, target 406 may be a remote object that is within the bistatic radar range of base station 402 and base station 404 but may have no communication with wireless communication system 400.

In the bistatic example shown in FIG. 4, the transmitter is the base station 402, and the receiver is the base station 404. More generally, base station 402 may be referred to as a Tx TRP, and base station 404 may be referred to as an Rx TRP. Here "Tx" and "Rx" merely refer to the fact that base station 402 is used to transmit the transmit signal 408, and base station 404 is used to receive echo signal 410. The terms "Tx" and "Rx" in this context do not limit the operation of the base stations 402 and 404 to serve other functions, for example, to serve as receiver and/or transmitter in other bistatic or multistatic radar operations or as base stations transmitting and receiving data communications in the normal operation of wireless communication system 400. While FIG. 4 illustrates a bistatic radar system, a multistatic radar system may also be implemented within a wireless communication system in a similar manner. Also, while FIG. 4 illustrates an example in a two-dimensional space, the same operations can be extended to the three-dimensional space.

Figure 5:
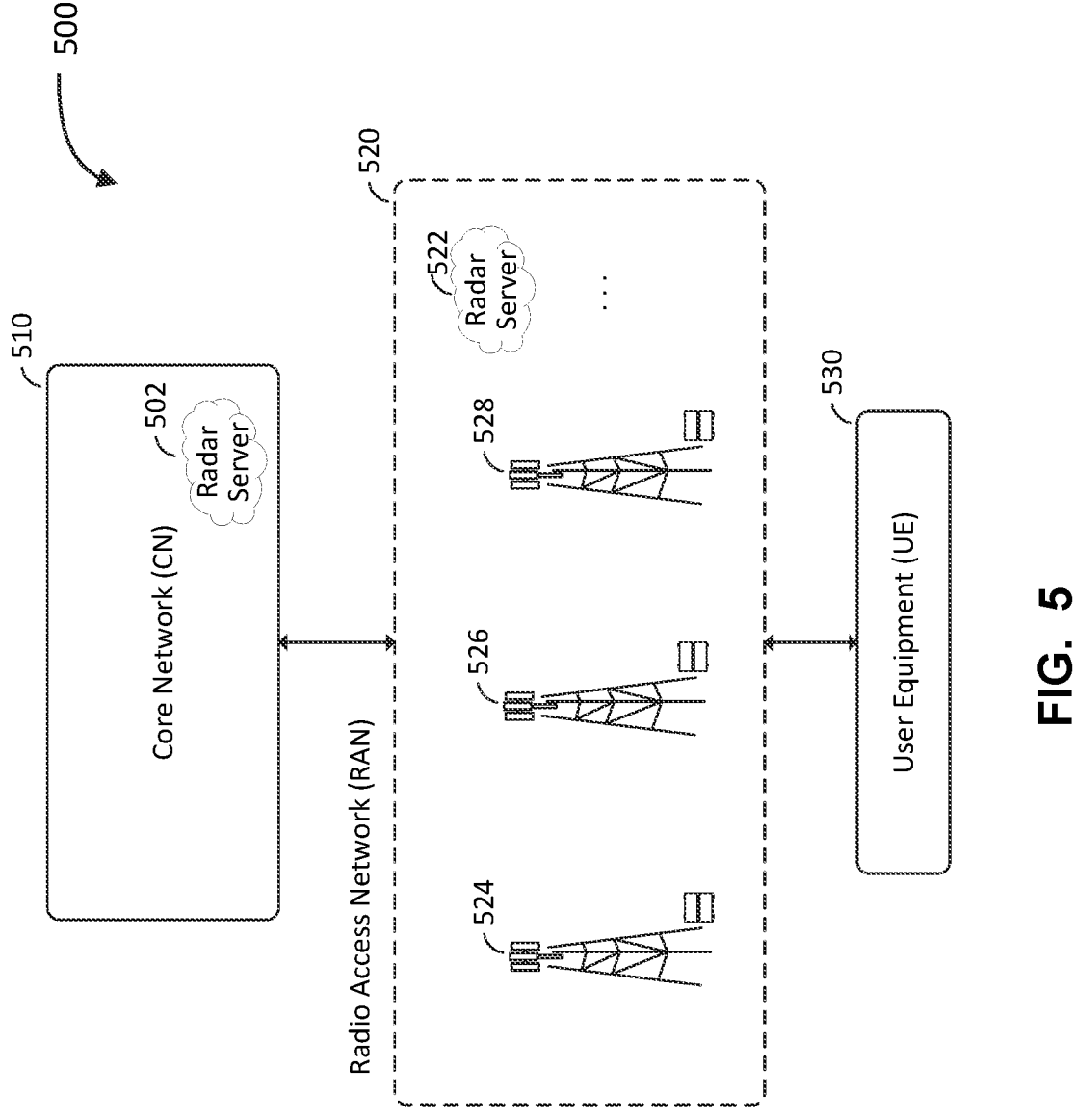
FIG. 5 is a block diagram of a wireless communication system that may include a radar server, according to certain embodiments.

FIG. 5 is a block diagram of a wireless communication system 500 that may include a radar server, according to certain embodiments. Wireless communication system 500 comprises a core node (CN) 510, a radio access network (RAN) 520, and one or more UEs 530. In one embodiment, a radar server 502 may be implemented within CN 510. CN 510 may provide wireless communication system 500 with connectivity to the Internet and to application services. CN 510 may be implemented with various computing resources, which may include memory and one or more processors executing an operating system and executing applications comprising programmed instructions. In a specific embodiment, the radar server 502 may be implemented within the computing resources of CN 510.

In another embodiment, a radar server 522 may be implemented within RAN 520. For example, RAN 520 may comprise base stations 524, 526, and 528. Each of base stations 524, 526, and 528 may comprise transmitter and receiver hardware such as antennas, antenna elements, cabling, a physical tower structure, modems, encoder/decoders, networking equipment, computing resources, and other components. The computing resources associated with each base station may include memory and one or more processors executing an operating system and executing applications comprising programmed instructions. In a specific embodiment, the radar server 522 may be implemented within the computing resources of one or more of base stations 524, 526, and 528.

Radar server 502 or 522 may be implemented in RAN 520, CN 510, or elsewhere in a wireless communication system 500, such as a cellular communication system. In some embodiments, radar server 502 or 522 may not be a dedicated server. For example, radar server 502 or 522 can be a generic server, a positioning server, an assisted driver server, a tracker server, or another server providing a different functionality. Furthermore, radar server 502 or 522 can be, but does not have to be, operated or owned by the network operator. Radar server 502 or 522 can be a network independent server (e.g. third party server).

Wherever it is implemented, radar server 502 or 522 may be communicatively coupled, via one or more interfaces, to the TRPs, e.g., base stations 524, 526, and 528, within RAN 520. The one or more interfaces may comprise point-to-point interfaces. An example of such a point-to-point interface is an interface implementing an Internet Protocol (IP) communication protocol over a wired network (e.g., "backhaul" network).

In certain embodiments, wireless communication system 500 may conform to 5G standards. In such cases, CN 510 may be a 5G core node (5G CN), RAN 520 may be a 5GPP Next Generation Radio Access Network (NG RAN), and each of the base stations 524, 526, and 528 may be a gNodeB or gNB. Thus, CN 510 may correspond to 5G CN 240 in FIG. 2 and RAN 520 may correspond to NG-RAN 235.

Figure 6:
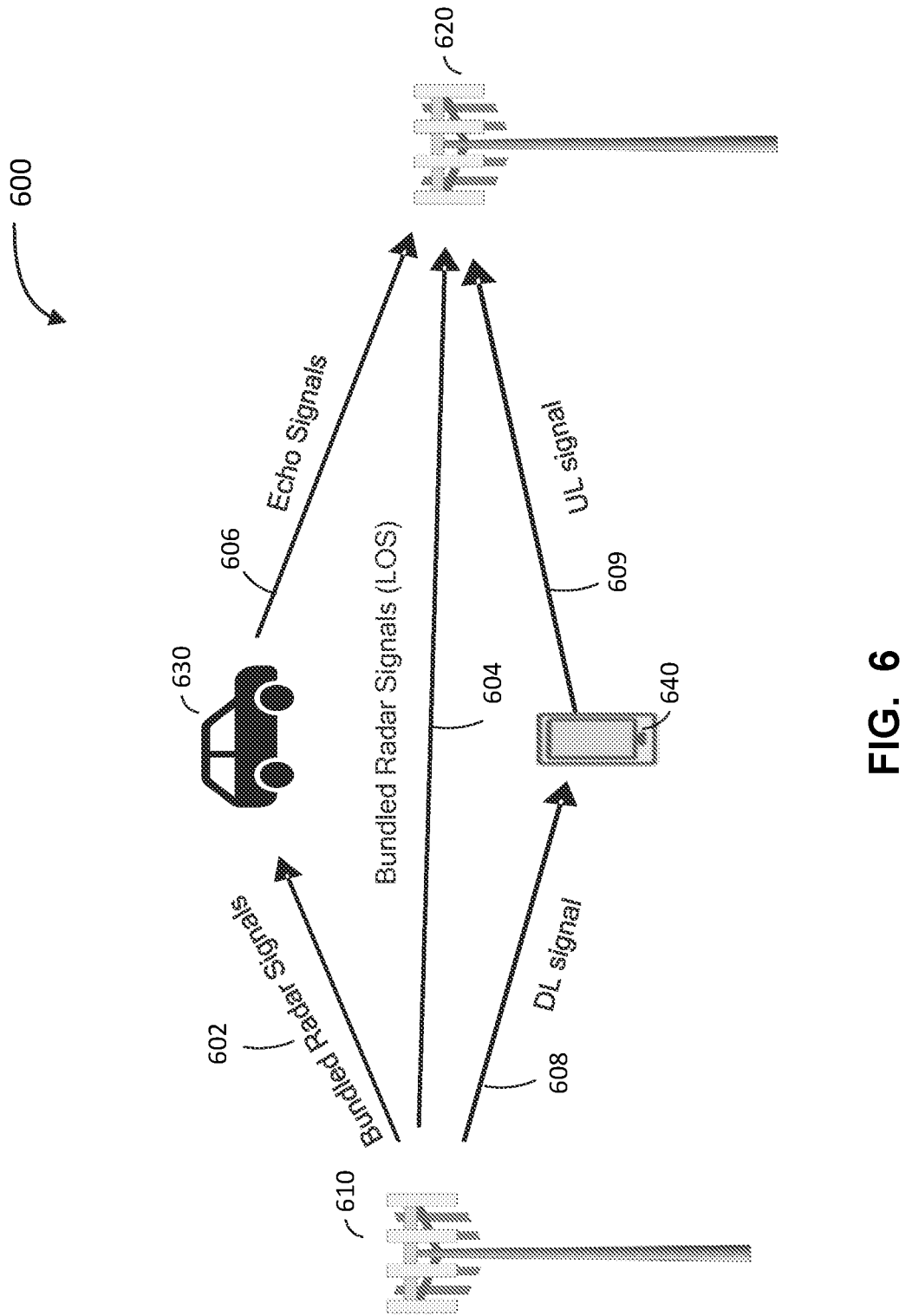
FIG. 6 illustrates an example of joint sensing and data communication in a wireless communication system, according to certain embodiments.

FIG. 6 illustrates an example of joint sensing and data communication in a wireless communication system 600, according to certain embodiments. FIG. 6 shows bundled radar signals 602 being transmitted from a first base station 610. The bundled radar signals 602 may include two or more radar signals transmitted in sequence. In particular, the radar signals 602 may be transmitted consecutively in a specific order or pattern that can be repeated. Each radar signal of the radar signals 602 may comprise a different code sequence that distinguishes the radar signal from other radar signals in the same bundle. The first base station 610 may transmit the radar signals 602 with a delay, corresponding to a measurement gap, between the end of a radar signal and the beginning of the next radar signal. The radar signals 602 may be transmitted using multiplexing (e.g., time or frequency-based multiplexing) and/or using modulation (e.g., amplitude or frequency modulation).

In some implementations, radar signals are transmitted using OFDM. When using OFDM, each radar signal of the radar signals 602 may be transmitted as multiple narrowband signals that are generated through quadrature amplitude modulation (QAM) with a respective carrier signal. Accordingly, each of the narrowband signals corresponds to a subchannel (sometimes referred to as a subcarrier) and has a specific phase associated with it, where the phase may vary over time and/or between different subcarriers. Further, each radar signal may be transmitted using a radio frame structure comprising one or more symbols, where a symbol can include one or more Resource Elements (REs) allocated over the frequency space of the subcarriers. Further details of a frame structure that supports OFDM symbols are described below in connection with FIG. 7.

The radar signals 602 are reflected from a target 630 and received as echo signals 606 by a second base station 620. The base stations 610 and 620 and other base stations in the wireless communication system 600 may form a bistatic or multistatic radar system. The second base station 620 may be configured to decode the echo signals 606 through cross-correlation with known reference radar signals and applying a Fast Fourier Transform (FFT) to samples of each echo signal, using measurement windows that may be preconfigured or communicated from the first base station 610 through a signaling operation prior to transmission of the radar signals 602. In order to process the echo signals in a coherent manner, phase continuity should be maintained between the echo signals 606 and, by extension, the radar signals 602 that produce the echo signals 606.

In addition to the radar signals 602, the first base station 610 may transmit a downlink (DL) signal 608 to a UE 640 and another set of bundled radar signals as LOS signals 604 to the second base station 620. The LOS signals 604 and the radar signals 602 may be in a same beam (e.g., different lobes of a same beam) or in different beams. The DL signal 608 may include, for example, downlink data from a server in communication with the first base station 610 and/or reference signals that facilitate downlink communication (e.g., an SSB signal for DL synchronization and communicating cell identity). Further, the UE may transmit an uplink (UL) signal 609 to the second base station 620. The UL signal 609 may include, for example, uplink data for processing by the second base station 620 or by a network entity communicatively coupled to the second base station 620. Additionally or alternatively, the UL signal 609 may include a reference signal that facilitates uplink communication (e.g., a Physical Random Access Channel (PRACH) signal containing a preamble used for UL synchronization).

FIG. 6 is merely one example of a joint sensing and data communication scenario. In FIG. 6, the radar transmitter is the first base station 610. However, the entity performing radar transmission can vary over time and/or depending on implementation. Thus, the UE 640 and the second base station 620 may also be configured to operate as radar transmitters. Likewise, data communication may be performed in a manner different from that depicted in FIG. 6. For example, the UE 640 may, at times, transmit UL data to the first base station 610 or sidelink (SL) data to another UE. Depending on the location of UE 640 at any given time, base station 610 or 620 may be the serving base station of a serving cell for uplink and downlink data communication with UE 640.

FIG. 6 also illustrates an example of a situation in which phase continuity may break with respect to bundled radar signals transmitted by a radar transmitter (e.g., the radar signals 602 or the LOS signals 604). In the example of FIG. 6, the first base station 610 may transmit the DL signal 608 in between consecutive bundled radar signals, for example, after transmitting a first radar signal of the radar signals 602 and before a second radar signal of the radar signals 602. As described above, switching between radar signal transmission and transmission of other RF signals may break the phase continuity between bundled radar signals as a result of changing power amplifier (PA) state. Similarly, when the UE 640 operates as a radar transmitter, transmission of a UL signal (e.g., the UL signal 609) in between consecutive bundled radar signals may cause phase continuity to break between the bundled radar signals.

Bundling of radar signals is useful for obtaining higher accuracy measurements from which a common parameter/attribute of a radar target can be estimated. When phase continuity breaks, the radar receiver may no longer be able to perform combined processing on the bundled radar signals. However, the radar receiver may still be able to process each radar signal individually, e.g., to estimate different parameters of the radar target or to obtain less accurate estimates of the same parameter. Techniques for maintaining phase continuity based on allocation of transmit resources and configuring the behavior of a radar transmitter and/or the behavior of a radar receiver are described below.

Figure 7:
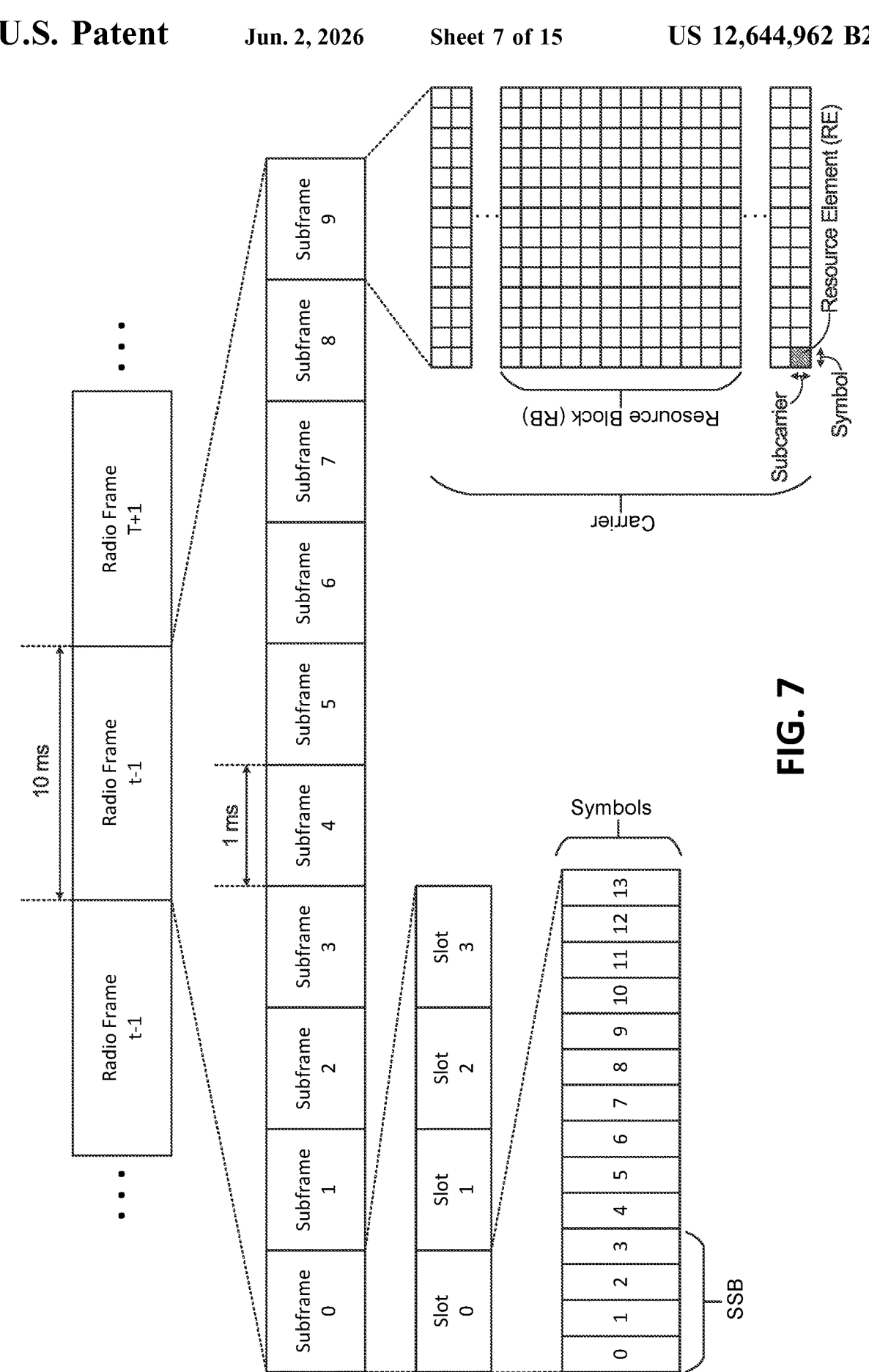
FIG. 7 is a diagram showing an example of a frame structure for NR and associated terminology.

FIG. 7 is a diagram showing an example of a frame structure for NR and associated terminology, which can serve as the basis for physical layer communication between RF devices, for example, between a UE and a base station such as serving gNB 210-1 in FIG. 2. The transmission timeline for each of the downlink and uplink may be partitioned into units of radio frames. Each radio frame may have a predetermined duration (e.g., 10 ms) and may be partitioned into subframes (e.g., 10 subframes of 1 ms each, as shown), with indices of 0 through 9. Each subframe may include a variable number of slots depending on the subcarrier spacing. Further, each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Also shown in FIG. 7 is the complete OFDM of a subframe, showing how a subframe can be divided across both time and frequency into a plurality of Resource Blocks (RBs). A single RB can comprise a grid of Resource Elements (REs) spanning a certain number of symbols and a certain number of subcarriers (e.g., 14 symbols and 12 subcarriers, as shown).

Each symbol in a slot may indicate a link direction (e.g., DL, UL, or flexible) or data transmission and the link direction for each subframe may be dynamically switched. The link directions may be based on the slot format. Each slot may include DL/UL data as well as DL/UL control information. In NR, a synchronization signal (SS) block (SSB) is transmitted. The SSB includes a primary SS (PSS), a secondary SS (SSS), and a two symbol Physical Broadcast Channel (PBCH). The SSB can be transmitted in a fixed slot location, such as the symbols 0-3 as shown in FIG. 7. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 8A:
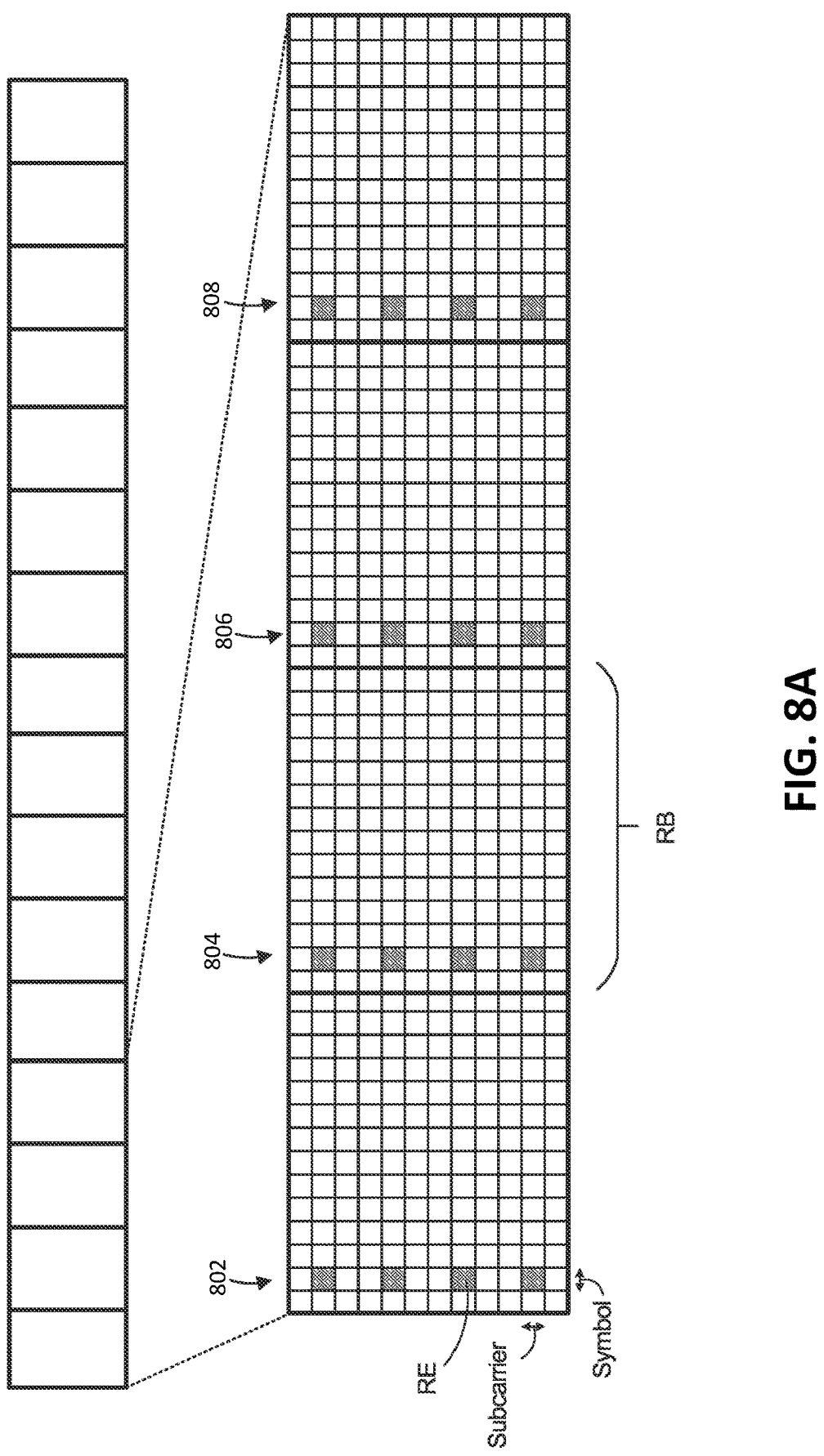
FIG. 8A illustrates an example of a frame structure in which one or more RF sensing signals are transmitted using multiple symbols.
Figures 8B, 8C:
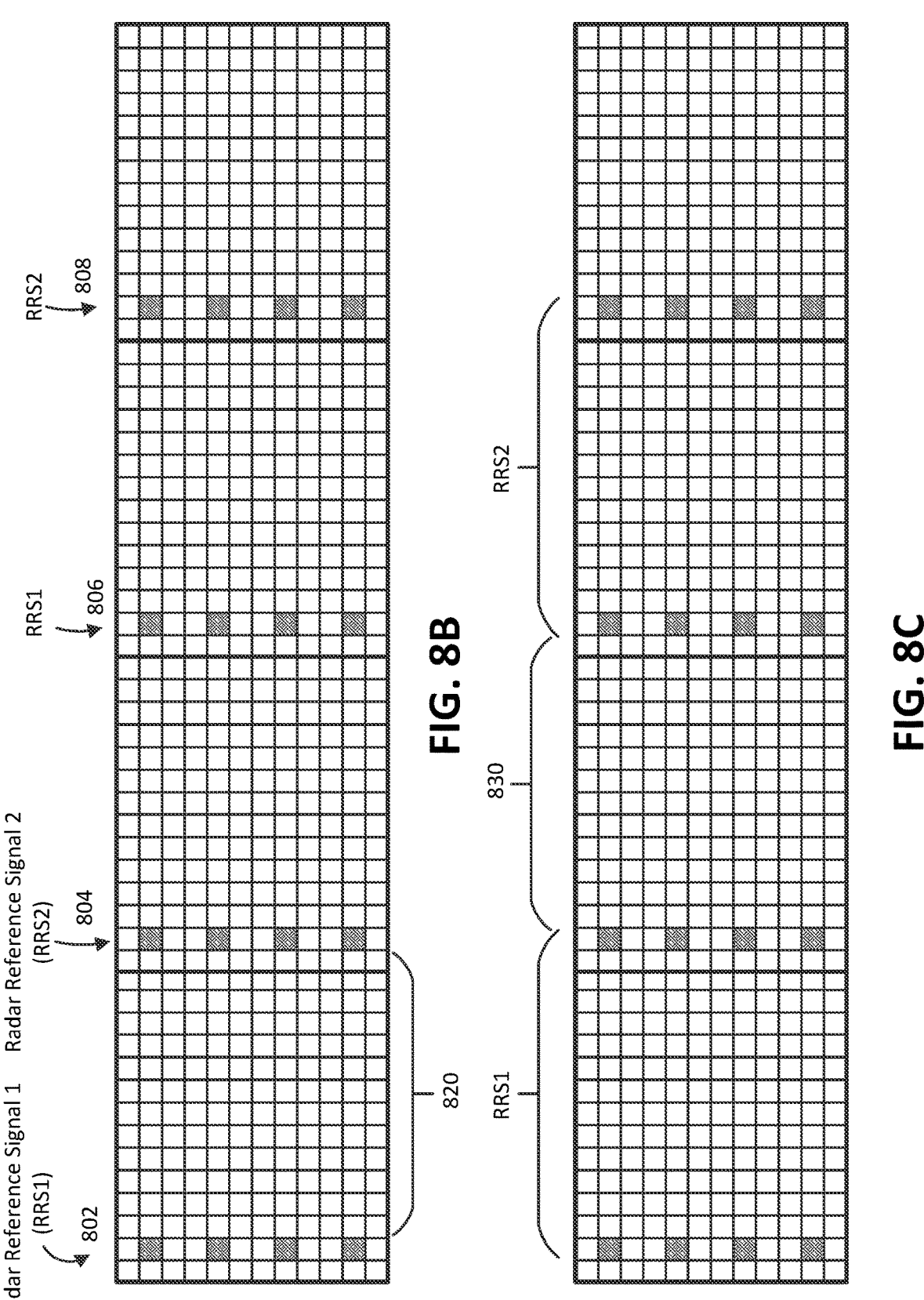
FIGS. 8B and 8C illustrate examples of bundled radar signals being transmitted in sequence.

FIG. 8A illustrates an example of a frame structure in which one or more RF sensing signals are transmitted using multiple symbols. The example of FIG. 8A adopts a 14-symbol by 12-subcarrier RB format. However, the size and dimensions of an RB can vary. In FIG. 8A, symbols 802, 804, 806, and 808 are transmitted in sequence. Each symbol corresponds to a collection of one or more REs (e.g., four REs, as shown). The number of REs in any individual symbol may vary. Further, the time separation between consecutive symbols can also vary. For illustration purposes, the symbols 802, 804, 806, and 808 are shown as uniformly spaced apart, with one symbol per RB. The duration between consecutive symbols of an RF sensing signal determines the Doppler resolution according to an inverse relationship. As the duration between consecutive symbols decreases, the Doppler resolution increases. FIGS. 8B and 8C illustrate examples of how the symbols shown in FIG. 8A may correspond to bundled radar reference signals (RRS1 and RRS2).

FIGS. 8B and 8C show examples of RRS1 and RRS2 being transmitted in sequence. In FIG. 8B, each occurrence/transmission instance of RRS1 and RRS2 is one symbol in duration, with RRS1 being allocated symbols 802 and 806, and RRS2 being allocated symbols 804 and 808. The number of symbols per occurrence of an RRS can vary. For example, FIG. 8C shows that each occurrence of RRS1 and RRS2 can include two symbols (802 and 804 for RRS1, 806 and 808 for RRS2). The number of REs per symbol and the distribution of REs across different subcarriers in a symbol can also vary. Each occurrence of an RRS corresponds to a duration in which the REs being transmitted for radar sensing purposes are exclusive to that particular RRS. When RRS1 is being transmitted, there are no REs allocated for transmission of RRS2. Similarly, when RRS2 is being transmitted, there are no REs allocated for transmission of RRS1.

RRS1 and RRS2 represent two radar signals that are bundled for combined processing by a radar receiver. When radar signals (or RF sensing signals in general) are bundled, the same frequency resources are used to transmit the bundled signals. Accordingly, as shown in FIGS. 8B and 8C, RRS1 and RRS2 are allocated REs in the same subcarriers. Each subcarrier may have a different phase associated with it. To enable combined processing, phase continuity should ideally be maintained between consecutive occurrences of RRS1 and RRS2, in particular, across REs allocated to the same subcarrier.

The transmission sequences in FIGS. 8B and 8C may also represent transmissions that occur in a joint sensing and data communication scenario. In joint sensing and data communication, additional REs may be allocated for transmission of RF signals that are used for data communication. Such RF signals could include, for example, synchronization signals or signals containing data being transmitted. In the context of a cellular communication system, data communication may involve transmission of voice data and/or non-voice data (e.g., a text message, streaming media, a webpage or other Internet content). These additional REs may be transmitted during an intervening time period between the bundled sensing signals. For example, REs corresponding to one or more RF signals used for data communication could be transmitted during a gap 820 in FIG. 8B or a gap 830 in FIG. 8C.

Because of differences in signal power requirements, bandwidth allocation (e.g., the signals used for data communication may have a narrower bandwidth than RRS1 and RRS2) and/or other factors, phase continuity can break when the radar transmitter switches between transmitting a radar signal (e.g., RRS1 or RRS2) and a data communication signal. Various techniques for maintaining phase continuity will now be described. The described techniques can be used together (e.g., at different times on the same device) or separately and may involve resource allocation constraints (e.g., establishing a time gap corresponding to a period of non-transmission). Alternatively or additionally, the techniques may involve configuration of transmitter or receiver behavior, for example, configuring the transmitter to restore a phase configuration associated with an earlier-transmitted radar signal and/or configuring the receiver to be inactive during a time period when the transmitter is restoring the phase configuration.

In some implementations, an RF transmitter is configured to allocate the same amount of frequency bandwidth to bundled sensing signals. In an OFDM based implementation, allocating the same frequency bandwidth may involve scheduling transmission using the same subcarriers. For example, RRS1 may be assigned a set of REs associated with specific subcarriers across one or more symbols, and RRS2 may be assigned its own REs associated with the same subcarriers as the REs of RRS1 but in a different symbol(s). FIGS. 8B and 8C are examples of such a uniform bandwidth allocation. Applying the same frequency bandwidth across bundled sensing signals helps to ensure that the sensing signals can be processed together at the receiver in a coherent manner.

As discussed above, one potential cause of phase discontinuity is changes in PA state. RF devices usually include an RF front end configured to generate a modulated RF signal for transmission The RF front end includes a PA coupled to an antenna of the RF device. The PA is configured to amplify the modulated RF signal and may apply a certain amount of gain. PAs have a frequency response in which the amount of phase shift introduced by the PA (advancing or delaying of the input signal to the PA) can vary depending on frequency. Additionally, PAs may be variable gain amplifiers, where the amount of gain applied is adjustable. In some PAs, the gain is digitally controlled so as to be settable to any number of discrete gain values. Changing gain can also lead to phase change or variation. For example, gain may be changed through adjusting a bias current to a transistor of the PA. The adjustment in the bias current can lead to a change in the input impedance of the transistor, which in turn produces a change in the amount of phase shift. Accordingly, the phase shift may not be constant across different gain settings. Allocating the same bandwidth to different sensing signals avoids frequency dependent phase variation that could otherwise lead to phase discontinuity. Phase variation can be further avoided if the RF transmitter is configured to use the same gain settings (or in general, maintain the same PA state) across different sensing signals.

Although allocating the same frequency bandwidth helps to maintain phase continuity, having the same bandwidth may not always be sufficient to ensure that there are no phase jumps or breaks in phase continuity, especially in a joint sensing and data communication scenario. Another method of maintaining phase continuity is to configure the transmitter to be inactive for a certain period of time between consecutive bundled sensing signals, as shown in FIG. 9.

Figure 9:
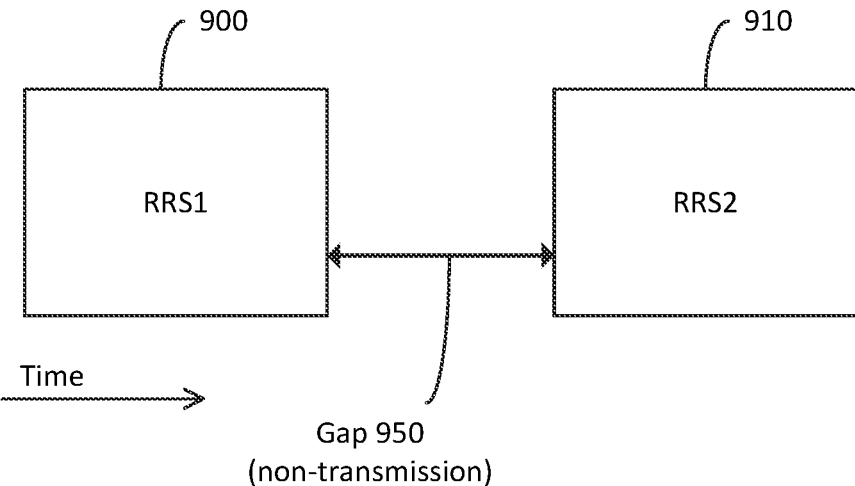
FIG. 9 illustrates a method of maintaining phase continuity using a non-transmission period, according to certain embodiments.

FIG. 9 illustrates a method of maintaining phase continuity using a non-transmission period, according to certain embodiments. In FIG. 9, RRS1 and RRS2 are shown as blocks 900 and 910, respectively. The blocks 900 and 910 represent time periods during which RRS1 and RRS2 are scheduled for transmission. As shown in FIG. 9, RRS1 and RRS2 are separated by a time gap 950 in which the transmitter of RRS1 and RRS2 is prevented from transmitting other RF signals (e.g., DL signals in the case of a base station or UL signals in the case of a UE). The duration of the gap 950 may be configurable. In some instances, the transmitter may be pre-configured with information on the duration of the gap 950. In other instances, the duration of the gap 950 is communicated to the transmitter from a remote entity. For example, if the transmitter is a UE, the UE may, prior to scheduling RRS1, receive information from a gNB indicating the length of the gap 950 as a symbol duration (e.g., a gap of 1-3 symbols). The duration of the gap 950 can be configured such that phase continuity will be maintained so long as the gap 950 does not exceed some threshold duration (e.g., 1-3 symbols may be a maximum permitted gap duration). The threshold duration depends on the hardware capabilities of the receiver. In general, phase continuity becomes increasingly difficult as the duration of the gap 950 increases. Limiting the duration of the gap 950 also minimizes idle time of the transmitter. Accordingly, if the transmitter is a UE, the UE may configure itself to not perform UL transmission during the gap 950, for example, transmission over a Physical Random Access Channel (PRACH), a Physical Uplink Control Channel (PUCCH), or a Physical Uplink Shared Channel (PUSCH), or transmission of a Sounding Reference Signal (SRS).

During the gap 950, the transmitter may be in an idle or powered down state. For example, power may still be supplied to a PA of the transmitter, but the input to the PA may be disabled. Power savings may result from the lack of transmission during the gap 950. Additional power savings may result if the transmitter is configured to avoid receiving and/or decoding information about what resources (e.g., REs) the transmitter would have otherwise used to transmit during the gap 950, e.g., information communicated to a UE-transmitter from a gNB over a Physical downlink control channel (PDCCH).

Although the transmitter may not be transmitting during the gap 950, the transmitter may nevertheless perform receive operations, e.g., using a receive antenna and associated receive circuitry. For example, if the transmitter is a UE, the UE may receive DL signals during the gap 950. Thus, the transmitter may still participate in data communication during the gap even when the transmitter is not transmitting. Although the method of FIG. 9 can be used to maintain phase continuity, it can potentially lead to wasted resources and unnecessary downtime of the transmitter. In some situations, it may be preferable to permit the transmitter to perform transmission operations between bundled sensing signals. An example of a method for maintaining phase continuity in conjunction with in-between sensing signal transmission is shown in FIG. 10.

Figure 10:
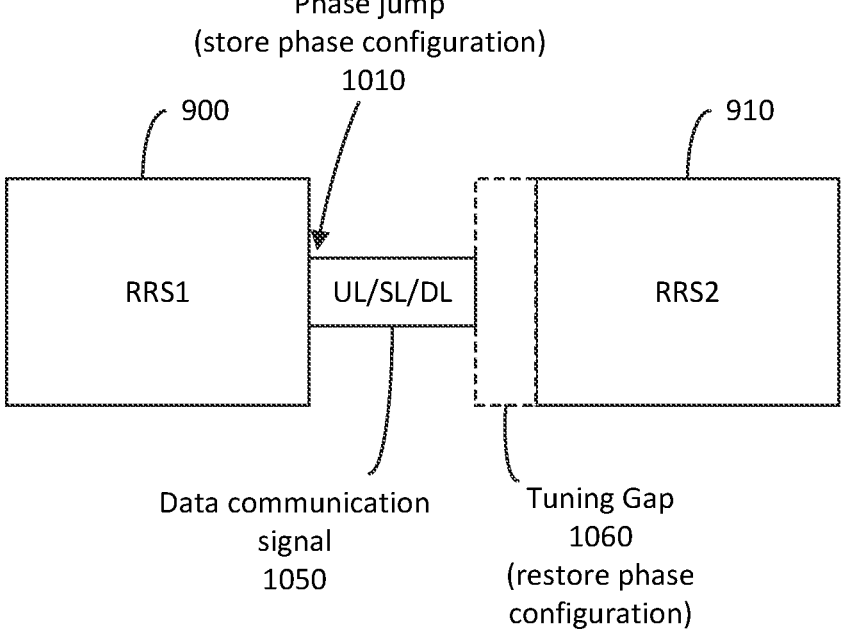
FIG. 10 illustrates a method of maintaining phase continuity through RF tuning, according to certain embodiments.

FIG. 10 illustrates a method of maintaining phase continuity through RF tuning, according to certain embodiments. FIG. 10 depicts a transmission scenario similar to that depicted in FIG. 9, except that instead of the gap 950, the intervening time period between RRS1 and RRS2 corresponds to a transmission period for a data communication signal 1050 followed by a tuning gap 1060. The data communication signal 1050 can be any signal transmitted in connection with sending data to or from the transmitter of RRS1 and RRS2. For example, the data communication signal 1050 may carry UL, SL, or DL data. Alternatively, the data communication signal 1050 could be a reference signal that facilitates UL/SL/DL communication (e.g., a synchronization signal).

When the data communication signal 1050 is a UL or SL transmission (e.g., PUSCH, PUCCH, SRS, or PRACH), the transmitter is a UE. To maintain phase continuity, the UE may first check whether the bandwidth allocation of the UL/SL transmission (e.g., the REs allocated to the data communication signal 1050) is the same as that of RRS1 and RRS2. If the bandwidth allocation is the same, then it can be assumed that phase continuity will be maintained without any additional measures since this implies that the PA state of the transmitter will not change over the course of transmitting RRS1, data communication signal 1050, and RRS2.

If the bandwidth allocation of the UL/SL transmission is different from that of RRS1 and RRS2, the UE may introduce the tuning gap 1060 between the data communication signal 1050 and the later of the two radar signals (in this example, RRS2). The tuning gap 1060 is a time period during which the UE does not perform any transmissions. Instead, the UE can use the tuning gap 1060 to perform an RF tuning operation that restores the phase configuration associated with RRS1 so that the subsequent transmission of RRS2 can be performed with phase continuity. As shown in FIG. 10, a phase jump 1010 may occur during the transition between RRS1 and the data communication signal 1050, for example, as a result of changing PA states due to a difference in bandwidth allocation. The phase jump 1010 breaks the phase continuity with respect to RRS1. To maintain phase continuity between RRS1 and RRS2, the phase configuration associated with RRS1 can be stored before transmitting data communication signal 1050, more specifically, before reconfiguring the PA of the transmitter in connection with transmitting data communication signal 1050. Information about the phase configuration associated with RRS1 may include, for example, the amount of phase shift at the end of RRS1, information about PA state at the end of RRS1 (e.g., a gain setting), and/or other information by which a phase shift that provides phase continuity with RRS1 can be determined for RRS2 (e.g., through extrapolating a waveform of RRS1 to the beginning of RRS2). Information about the PA state at the end of an RRS (e.g., RRS1) can be obtained at or near the end of the RRS. However, such information may, in some instances, be available to the transmitter even before beginning to transmit the RRS because PA state usually remains constant for the entire duration of each RRS, assuming that every symbol of the RRS has the same bandwidth.

The tuning gap 1060 represents a minimum duration needed to complete the RF tuning operation. The RF tuning operation may involve reconfiguring the PA of the transmitter in preparation for transmission of RRS2. As with the duration of the gap 950 in FIG. 9, the duration of the tuning gap 1060 can be pre-configured or communicated to the transmitter. For example, in the UL/SL transmission scenario, the duration of the gap 950 may be signaled by a gNB and expressed in terms of a certain number of symbols. In some implementations, the duration of gap 950 and/or tuning gap 1060 may be specified in a technical standard (e.g., a 3GPP standard), and the entity that determines the gap duration (e.g., a gNB) may perform a lookup into a table storing a list of gap values to use for different situations in accordance with the technical standard. The table can be stored locally (e.g., in a memory of the gNB) or on a network device such as radar server 160 in FIG. 1. In other implementations, the entity that determines the duration of gap 950 or tuning gap 1060 may select the gap duration based on the capabilities of the transmitter. For example, prior to transmitting RRS1, the UE may have reported its capabilities to a gNB so that the gNB can take the UE's capabilities into consideration when selecting the gap duration.

When the data communication signal 1050 is a DL transmission (e.g., SSB), the transmitter is a base station (e.g., gNB). Similar to the UL/SL scenario, the base station may perform an initial check on whether the allocated bandwidth of the DL transmission is the same as that of RRS1 and RRS2. If the bandwidth allocation is the same, then it can be assumed that phase continuity will be maintained without any additional measures since this implies that the PA state of the transmitter (in this instance, the base station) will not change over the course of transmitting RRS1, data communication signal 1050, and RRS2.

If the bandwidth allocation of the DL transmission is different from that of RRS1 and RRS2, the base station may introduce the tuning gap 1060 between the data communication signal 1050 and RRS2. In the DL scenario, the tuning gap 1060 is a time period during which the base station does not perform any transmissions. Instead, the base station can use the tuning gap 1060 to perform an RF tuning operation that restores the phase configuration associated with RRS1, similar to the tuning operation described above with respect to the UE during UL/SL transmission.

As indicated in the example of FIG. 10, when there is a phase jump across an RRS transmission and some other reference signal or channel transmission, the transmitter can store the phase configuration (e.g., PA state) at the end of the RRS transmission and use this stored information to restore the phase configuration before starting the next RRS transmission in a sequence of bundled RRS transmissions. This restoration process can be applied not only to radar signals, but also to other types of sensing signals. However, the transmitter may not always be capable of maintaining phase continuity. For example, the transmitter may not support the use of tuning gap 1060. In such situations, the receiver can be informed about the transmitter's inability to maintain phase continuity. For example, in a bistatic radar system where the transmitter is a first base station and the receiver is a second base station, the first base station or a network entity communicatively coupled to both base stations may send a message to the second base station indicating that the first base station cannot guarantee phase continuity between bundled radar signals. In this manner, the second base station can avoid processing the bundled radar signals together and may, instead, process each radar signal separately.

Figure 11:
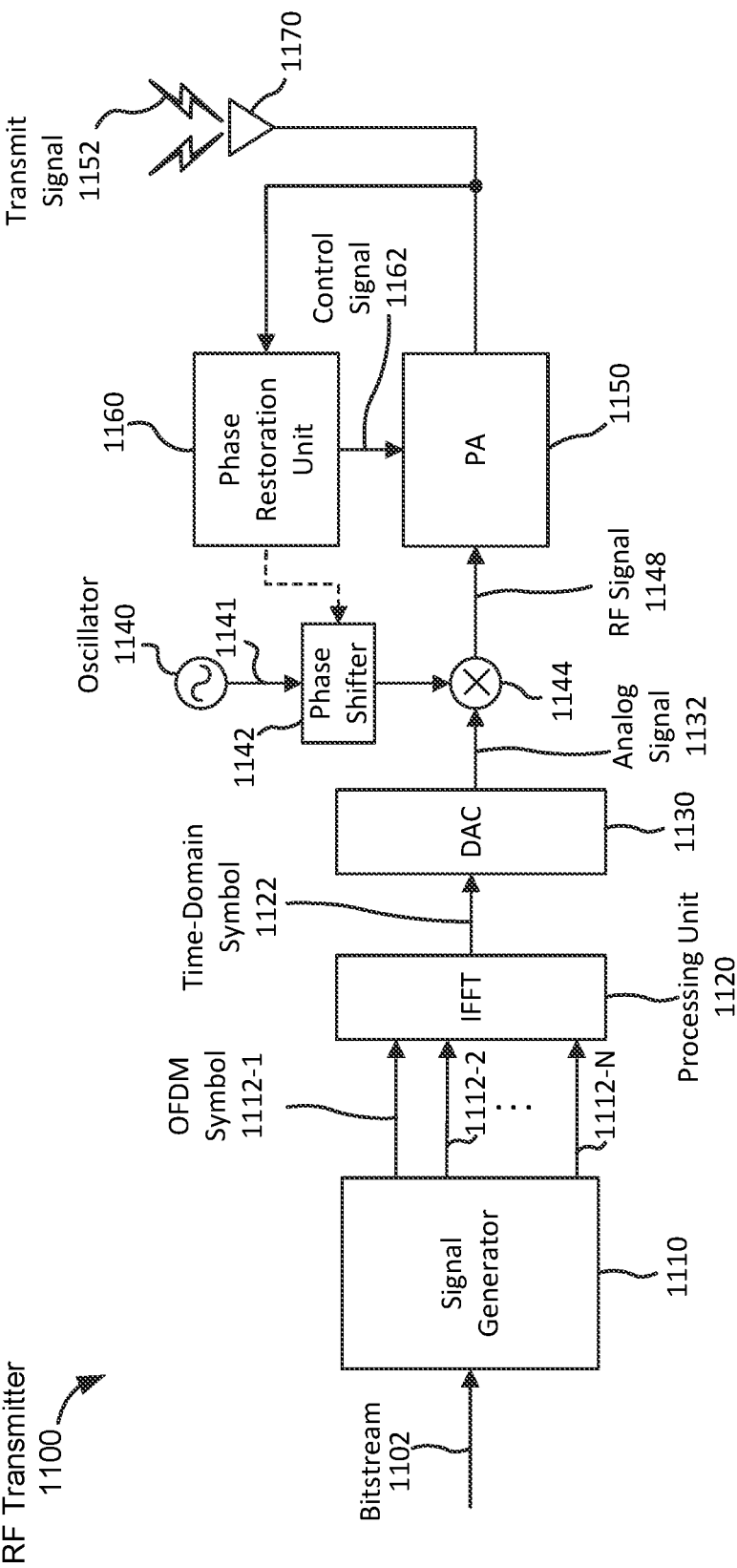
FIG. 11 is a block diagram of an RF transmitter usable for implementing one or more embodiments.

FIG. 11 is a block diagram of an RF transmitter 1100 usable for implementing one or more embodiments. The RF transmitter 1100 is operable to generate sensing signals and data communication signals for transmission. In some implementations, the RF transmitter 1100 is a radar transmitter in a monostatic, bistatic, or multistatic radar system. The RF transmitter 1100 may implement a wireless communications interface of a base station, a UE, or other wireless device. As shown in FIG. 11, RF transmitter 1100 may include a signal generator 1110, a processing unit 1120, a digital-to-analog converter (DAC) 1130, an oscillator 1140, a phase shifter 1142, a mixer 1144, a PA 1150, a phase restoration unit 1160, and an antenna 1170.

It should be noted that FIG. 11 provides only a generalized illustration of various components, any or all of which may be utilized as appropriate, and each of which may be duplicated as necessary. For example, RF transmitter 1100 may also be configured to operate as an RF receiver, i.e., RF transmitter 1100 may be a transceiver. The RF receiver may perform operations that are complementary to corresponding operations performed by the transmission components. For example, the RF receiver may perform filtering on an analog receive signal, convert the analog receive signal into a digital signal, and remove cyclic prefixes before performing a Fast Fourier Transform (FFT) to convert time-domain symbols into frequency-domain symbols for further processing.

Additionally, FIG. 11 is a simplified block diagram that omits certain processing details for the sake of simplicity. For example, although FIG. 11 shows a single input stream of symbols to the DAC 1130, the symbols may be complex symbols with real and imaginary components. Accordingly, the DAC 1130 may include a first DAC for converting a real signal and a second DAC for converting an imaginary signal.

Signal generator 1110 is configured to generate multiple OFDM symbols 1112 (e.g., symbols 1112-1 and 1112-2 to 1112-N). Each of the symbols 1112 may correspond to a different subcarrier in the frequency domain. Depending on the signal to be transmitted, the symbols 1112 may correspond to a sensing signal (e.g., RRS1 or RRS2 in FIGS. 9 and 10) or a data communication signal (e.g., an UL/DL/SL transmission). To generate the OFDM symbols 1112, the signal generator 1110 may perform modulation on an input bitstream 1102 to convert the bitstream 1102 from a serial data stream to parallel streams of symbols 1112 on multiple subcarriers. The signal generator 1110 may modulate each subcarrier independently using, for example, quadrature amplitude modulation and a different carrier signal for each subcarrier.

Processing unit 1120 is configured to perform digital signal processing on the symbols 1112, including applying an Inverse Fast Fourier Transform (IFFT) separately to each of the input streams corresponding to the OFDM symbols 1112 to produce a set of complex signals across the multiple subcarriers. The processing unit 1120 may then combine the results of the IFFTs into a serial stream that includes time-domain symbols 1122. The processing unit 1120 may also insert a cyclic prefix between each of the time-domain symbols 1122 to form an input to the DAC 1130. The DAC 1130 is configured to convert the time-domain symbols 1122 into an analog signal 1132 for transmission.

Oscillator 1140 (e.g., a voltage-controlled oscillator) is configured to generate a carrier signal 1141 at a particular carrier frequency for input to the mixer 1144. The mixer 1144 is configured to produce an RF signal 1148 through mixing the carrier signal 1141 with the analog signal 1132. The carrier signal 1141 is separate from the carrier signals (not depicted) used to produce the OFDM symbols 1112. The carrier signal 1141 is used to convert the analog signal 1132 to the RF domain, specifically, to a transmission frequency of the RF signal 1148. As shown in FIG. 10, the carrier signal 1141 may be phase-shifted (e.g., 90 degrees) by the phase shifter 1142 prior to being input to the mixer 1144. Additionally, the RF transmitter 1100 may include one or more filtering stages (e.g., a low-pass and/or band-pass filter). Filtering can be performed before and/or after mixing the carrier signal 1141 with the analog signal 1132.

PA 1150 is configured to amplify RF signal 1148 to produce a transmit signal 1152 for transmission by antenna

1170 or, in some implementations, multiple antennas of an antenna array. The PA 1150 may be a variable gain amplifier with multiple gain settings. In some implementations, PA 1150 may include multiple gain stages such that the amount of amplification provided by the PA 1150 can be varied through bypassing one or more gain stages and/or through adjusting the input to one or more gain stages, e.g., by adjusting the magnitude of a bias current applied to a bipolar junction transistor or field-effect transistor.

Phase restoration unit 1160 is configured to restore phase continuity between bundled sensing signals through storing and restoring a phase configuration, e.g., according to the method depicted in FIG. 10. To store the phase configuration, the phase restoration unit 1160 may include circuitry that detects the phase of transmit signal 1152. For example, phase restoration unit 1160 may include a phase-locked loop (PLL) that is activated when the transmit signal 1152 is a radar reference signal but deactivated when the transmit signal 1152 is a data communication signal. Phase restoration unit 1160 can include a local memory or be coupled to an external memory that stores the phase configuration. The phase configuration may, for example, be stored in a table structure containing one or more timestamped entries indicating a phase value of the transmit signal 1152 at a particular point in time (e.g., one millisecond before the phase jump 1010).

In some implementations, the phase configuration may, in addition or as an alternative to the phase value, include information about the operating state of the PA 1150. For example, the phase configuration stored by the phase restoration unit 1160 may indicate a gain setting that was used by PA 1150 to generate the transmit signal 1152. The phase restoration unit 1160 can obtain the information about the operating state of the PA 1150 directly from the PA 1150 or from some other component of the RF transmitter 1100 that has access to such information. Accordingly, the phase configuration need not explicitly describe the phase of the transmit signal 1152 and may, in general, include any information by which the phase of the transmit signal 1152 at a particular point in time can be determined.

To restore the phase configuration, the phase restoration unit 1160 may generate a control signal 1162 based on the stored phase configuration. The control signal 1162 is input to the PA 1150 in connection with transmission of the next sensing signal (e.g., RRS2) in the same bundle of sensing signals and to set the PA 1150 to the same operating state as when the phase configuration was stored.

Alternatively or additionally, restoring the phase configuration may involve the phase restoration unit 1160 determining a phase value for the next sensing signal (e.g., RRS2) based on the phase value of the previous sensing signal (e.g., RRS1). The phase value for the next sensing signal is not necessarily identical to the phase value of the previous sensing signal. The phase restoration unit 1160 may be configured to calculate the phase value for the next sensing signal as being the phase value of the previous sensing signal at the time that transmission of the next sensing signal is scheduled to begin, had the previous sensing signal continued to be transmitted up until such time. Thus, the phase restoration unit 1160 may calculate the phase value for the next sensing signal through extrapolation. The phase value for the next sensing signal can be realized through generating the control signal 1162 accordingly or, as indicated by the dashed line in FIG. 11, through a control signal applied to a phase shifter such as the phase shifter 1142.

FIG. 12 is a flow diagram of a method 1200 of maintaining phase continuity between a pair of bundled radar signals, according to an embodiment. Means for performing the functionality illustrated in one or more of the blocks shown in FIG. 12 may be performed by hardware and/or software components of a first RF device (e.g., a UE or base station) in communication with a second RF device (e.g., another UE or base station), where the first RF device is equipped with a radar transmitter or radar transceiver.

At 1210, the first RF device transmits a first radar signal and a second radar signal in sequence using a same carrier frequency. The carrier frequency may correspond to one of a plurality of subcarriers over which the first RF device transmits the first radar signal and the second radar signal in sequence. The first RF device may be configured to transmit the first radar signal and the second radar signal (and potentially additional radar signals that form the same bundle) repeatedly according to the same sequence or pattern each time. For example, the first RF device may alternate between transmitting the first radar signal and the second radar signal, as shown in FIG. 8B.

The first RF device can transmit the first radar signal and the second radar signal using OFDM. A bandwidth of frequency resources allocated for transmission of the first radar signal may be the same as that allocated for transmission of the second radar signal. For example, the first RF device may be a base station configured to determine which subcarriers and distribution of Resource Elements across one or more symbols of a Resource Block to use for transmitting the first radar signal, and the first RF device may apply the same resource allocation to the second radar signal. In some instances, the resource allocation may be specified by an entity other than the first RF device. For example, if the first RF device is a UE, the resources allocated for transmission of the first radar signal and the second radar signal may have been communicated to the UE from a base station (e.g., the second RF device or some other network entity).

The first RF device may transmit the first radar signal and the second radar signal into the environment for reflection off a radar target as echo signals that are combined for processing by a radar receiver to determine one or more attributes of the radar target. In a bistatic or multistatic radar system, the processing of the echo signals can be performed by a radar receiver that is not collocated with the first RF device. For example, the first RF device could be the base station 610 in FIG. 6, the second RF device could be the UE 640, and the radar receiver could be the base station 620. Alternatively, the radar receiver and the second RF device could be the same entity (e.g., UE 640 or base station 620). In a monostatic radar system, the first RF device may operate as the radar receiver. Thus, the radar receiver can be the first RF device, the second RF device, or some other device configured to receive the echo signals. Further, as evident from the example in FIG. 6, the first radar signal and the second radar signal can be transmitted as LOS signals (e.g., the LOS signals 604).

The attribute(s) of the radar target determined as a result of processing the first radar signal and the second radar signal (or echoes thereof) together can include, for example, range (e.g., distance based on flight time), velocity (e.g., relative speed based on Doppler frequency), and/or angular direction (e.g., angle of arrival at an antenna array of the radar receiver). As discussed above, phase continuity should be maintained in order to enable a common set of one or more attributes/parameters to be determined through combined processing of two or more radar signals.

At 1220, the first RF device engages in data communication with the second RF device. In a joint sensing and data communication scenario, such data communication can occur between transmissions of bundled sensing signals, for example, during an intervening time period between the first radar signal and the second radar signal. The data communication may involve transmission of a data communication signal from the first RF device to the second RF device or vice versa. Accordingly, the data communication can be a UL, DL, or SL transmission in which the first RF device is either the transmitter of the data communication signal or the receiver of the data communication signal. The data communication signal can be transmitted using the same multiplexing or modulation scheme as the first radar signal and the second radar signal (e.g. OFDM). However, as discussed earlier, a data communication signal may have a different frequency bandwidth, be transmitted with a different power level, or otherwise require a different PA state compared to bundled radar signals, resulting in a break in phase continuity (e.g., phase jump 1010 in FIG. 10).

At 1230, the first RF device configures itself to maintain phase continuity between the first radar signal and the second radar signal. The first RF device can maintain phase continuity through RF tuning or by not transmitting during the intervening time period. Depending on the capabilities of the first RF device, one or both options for maintaining phase continuity may be supported. RF tuning can be performed during a tuning gap (e.g., tuning gap 1060) that occurs after the data communication signal is transmitted (in this case, from the first RF device to the second RF device) and before transmitting the second radar signal.

The RF tuning may involve storing and restoring a phase configuration, as described above in connection with FIG. 10. The phase configuration can include an operating state of a PA in the first RF device during an end of the first radar signal. The phase configuration or, more specifically, information describing the phase configuration, may be stored in a memory (e.g., a hardware register, random access memory (RAM), or flash memory) of the first RF device. In some implementations, the first RF device may also be configured to store (in the same or a different memory) a lookup table that maps different possible phase configurations to settings (e.g., gain values) associated with those phase configurations.

Restoring the phase configuration may involve setting the PA back to the same operating state as the PA was in during the end of the first radar signal, e.g., using a control signal from a phase restoration unit coupled to the PA, as shown in FIG. 11. In some implementations, the RF tuning may involve adjusting a bias current to a transistor in the PA, e.g., a collector or emitter current of a bipolar junction transistor. In some implementations, the PA may include a resonant circuit formed of inductive and capacitive elements (e.g., an LC tank circuit connected between a supply voltage and the collector of the above-mentioned bipolar junction transistor), and the RF tuning may involve adjusting a resonance frequency of the resonant circuit by, for example, electronically controlling a variable capacitor in the resonant circuit.

Other methods of restoring the phase configuration are also possible. For example, the RF tuning in block 1230 may involve reconfiguring a phase shifter such as the phase shifter 1142 in FIG. 11. In general, any RF-based technique for setting the phase of the second radar signal to what the phase of the first radar signal would have been had the first radar signal continued to be transmitted up until the starting point of the second radar signal (taking into account the duration of the intervening period) can be used. The RF tuning can be performed by one or more processing units of the first RF device, for example, by a processor or integrated circuit that implements the phase restoration unit 1160 and/or by some other control unit (e.g., a Central Processing Unit) of the first RF device.

As an alternative to performing RF tuning, the first RF device may maintain phase continuity through preventing transmission by the first RF device over an entirety of the intervening time period (e.g., by introducing the gap 950 in FIG. 9). The prevention of transmission can be performed when the first RF device operates as a receiver, e.g., when the data communication signal is transmitted to the first RF device from the second RF device during the intervening period. Additionally, as described above, in some instances a radar transmitter may not be capable of maintaining phase continuity. In such instances, the first RF device may optionally communicate to the second RF device (e.g., prior to transmitting the first radar signal) an indication that the first RF device will not be maintaining phase continuity, which may cause the second RF device to process the first radar signal and the second radar signal independently.

Figure 13:
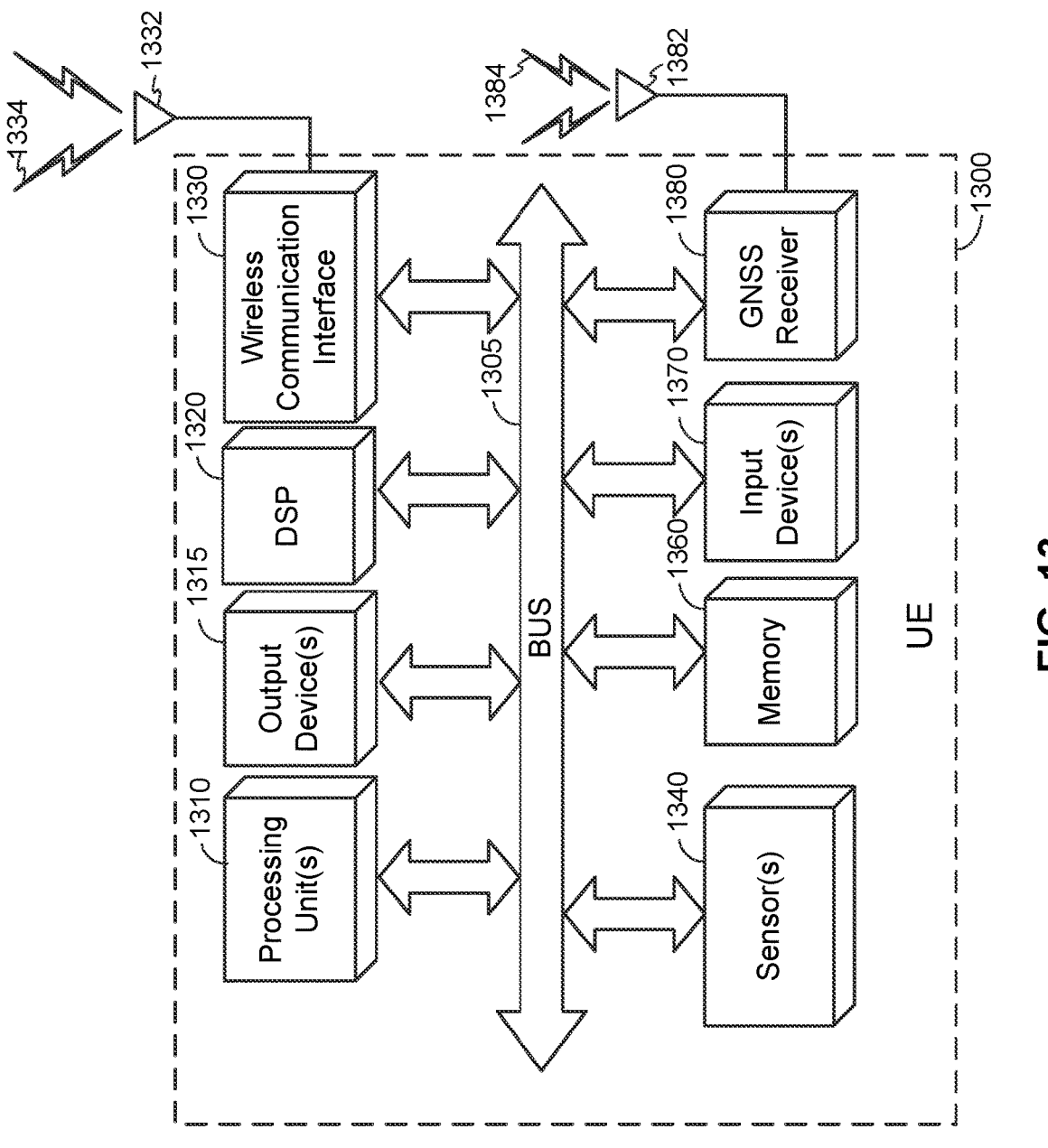
FIG. 13 is a block diagram of an embodiment of a UE, which can be utilized in embodiments as described herein.

FIG. 13 is a block diagram of an embodiment of a UE 1300, which can be utilized as described herein above (e.g., as the UE 640 in FIG. 6). For example, the UE 1300 can perform one or more of the functions of the method shown in FIG. 12. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. The functionality of the UE discussed in the previously described embodiments may be executed by one or more of the hardware and/or software components illustrated in FIG. 13.

The UE 1300 is shown comprising hardware elements that can be electrically coupled via a bus 1305 (or may otherwise be in communication, as appropriate). The hardware elements may include one or more processing unit(s) 1310, which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processing unit(s) 1310 may comprise one or more processing units housed in a single integrated circuit (IC) or multiple ICs. As shown in FIG. 13, some embodiments may have a separate DSP 1320, depending on desired functionality. Location determination and/or other determinations based on wireless communication may be provided in the processing unit(s) 1310 and/or wireless communication interface 1330 (discussed below). The UE 1300 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 1300 may also include a wireless communication interface 1330, which may comprise without limitation a modem, a network card, an infrared communication device, a wireless communication device, a radar transceiver, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1300 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1300 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information. In some implementations, a sensor 1340 may include an RF-based sensor such as the RF transmitter 1100 in FIG. 11. Accordingly, one or more sensors 1340 may be integrated with the wireless communication interface 1330.

Embodiments of the UE 1300 may also include a GNSS receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 1300, using conventional techniques, from GNSS satellites of a GNSS system, such as GPS, Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processing unit(s) 1310, DSP 1320, and/or a processor within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processing unit(s) 1310 or DSP 1320.

The UE 1300 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 1300 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 1300 (and/or processing unit(s) 1310 or DSP 1320 within UE 1300). In some embodiments, then, such code and/or instructions can be used to configure and/or adapt a general-purpose computer (or other device) to perform one or more operations in accordance with the described methods.

Figure 14:
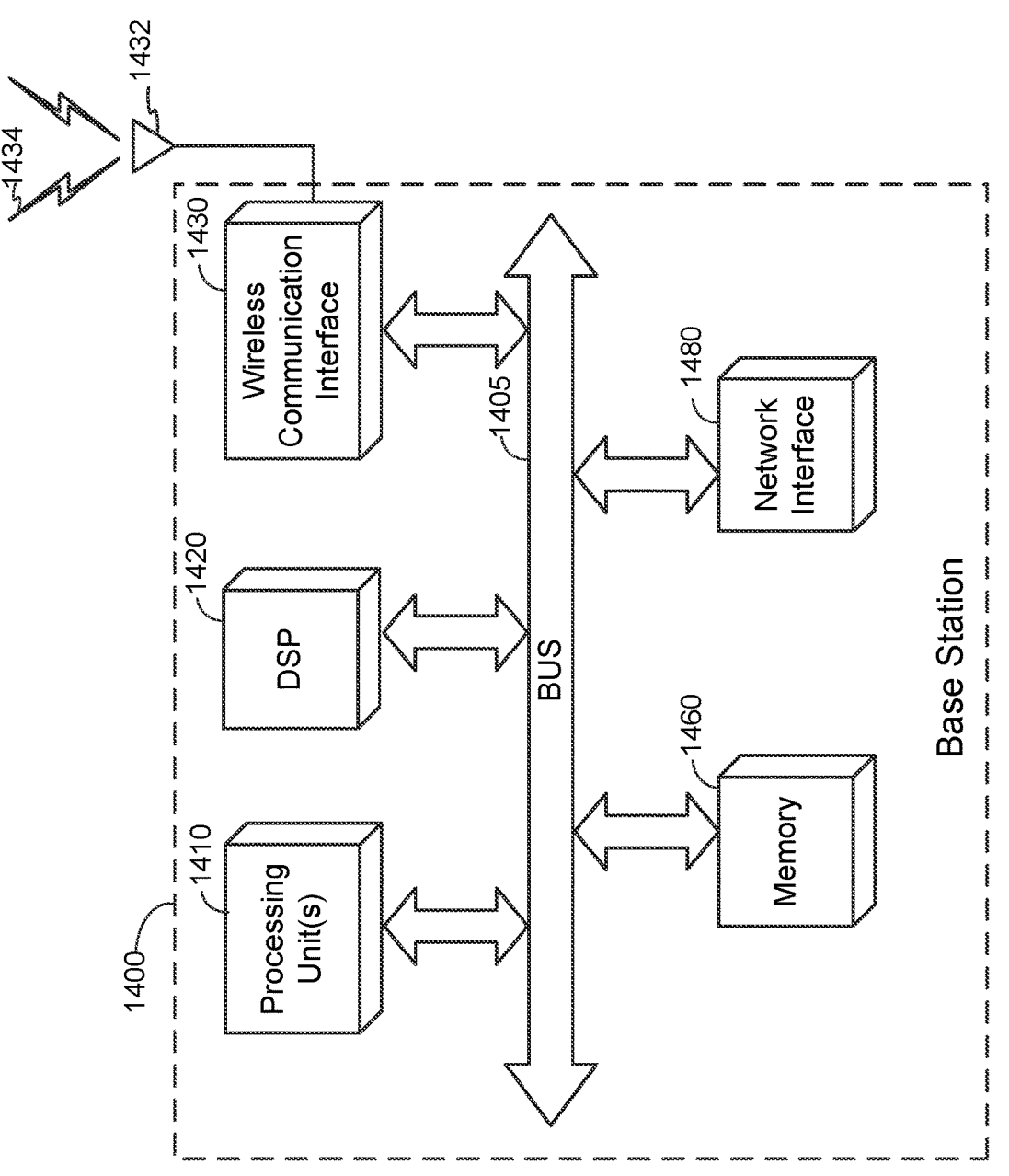
FIG. 14 is a block diagram of an embodiment of a base station, which can be utilized in embodiments as described herein.

FIG. 14 is a block diagram of an embodiment of a base station 1400, which can be utilized as described herein above (e.g., as base station 610 or 620 in FIG. 6). It should be noted that FIG. 14 is meant only to provide a generalized illustration of various components, any or all of which may be utilized as appropriate. For example, the base station 1400 can perform one or more of the functions of the method shown in FIG. 12. In some embodiments, the base station 1400 may correspond to a gNB, an ng-eNB, and/or (more generally) a TRP.

The base station 1400 is shown comprising hardware elements that can be electrically coupled via a bus 1405 (or may otherwise be in communication, as appropriate). The hardware elements may include one or more processing unit(s) 1410, which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processing unit(s) 1410 and/or wireless communication interface 1430 (discussed below), according to some embodiments. The base station 1400 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1400 may also include a wireless communication interface 1430, which may comprise without limitation a modem, a network card, an infrared communication device, a wireless communication device, a radar transceiver, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1400 to communicate as described herein. The wireless communication interface 1430 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

The base station 1400 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein.

In many embodiments, the base station 1400 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the base station 1400 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the base station 1400 (and/or processing unit(s) 1410 or DSP 1420 within base station 1400). In some embodiments, then, such code and/or instructions can be used to configure and/or adapt a general-purpose computer (or other device) to perform one or more operations in accordance with the described methods.

Figure 15:
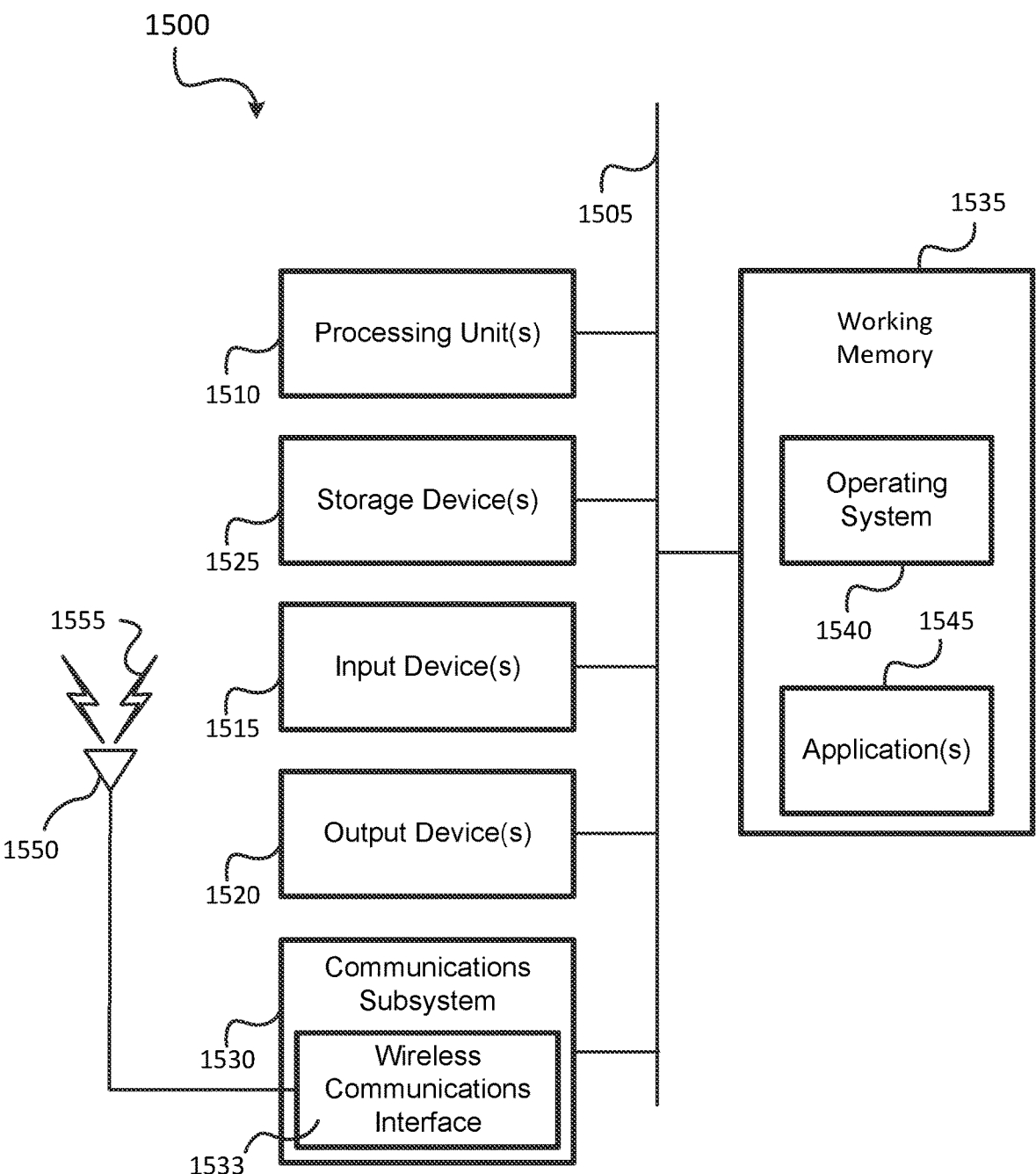
FIG. 15 is a block diagram of an embodiment of a computer system, which can be utilized in embodiments as described herein.

FIG. 15 is a block diagram of an embodiment of a computer system 1500, which may be used, in whole or in part, to provide the functions of one or more network components as described in the embodiments herein (e.g., radar server 160 of FIG. 1 or radar server 502/522 in FIG. 5). It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include one or more processing unit(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may comprise wireless communication technologies managed and controlled by a wireless communication interface 1533, as well as wired technologies (such as Ethernet, coaxial communications, universal serial bus (USB), and the like). The wireless communication interface 1533 may comprise one or more wireless transceivers may send and receive wireless signals 1555 (e.g., signals according to 5G NR or LTE) via wireless antenna(s) 1550. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a UE, base stations and/or other TRPs, and/or any other electronic devices described herein. Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method comprising, by a first radio frequency (RF) device: transmitting a first radar signal and a second radar signal in sequence using a same carrier frequency, wherein the first radar signal and the second radar signal or echoes of the first radar signal and the second radar signal are processed together to determine an attribute of a radar target; engaging in data communication with a second RF device during an intervening time period between the first radar signal and the second radar signal, wherein the engaging in data communication with the second RF device involves transmitting a data communication signal to the second RF device or receiving the data communication signal from the second RF device; and maintaining phase continuity between the first radar signal and the second radar signal, wherein the maintaining of phase continuity comprises: (i) performing RF tuning after transmitting the data communication signal to the second RF device and before transmitting the second radar signal, or (ii) preventing transmission by the first RF device over an entirety of the intervening time period.

Clause 2. The method of clause 1, wherein the first RF device and the second RF device form a bistatic or multistatic radar system.

Clause 3. The method of clause 1 or 2, wherein the first RF device is a base station, wherein the second RF device is a User Equipment (UE), and wherein the data communication signal is a downlink signal sent from the base station to the UE.

Clause 4. The method of clause 1 or 2, wherein the first RF device is a User Equipment (UE), wherein the second RF device is a base station, and wherein the data communication signal is an uplink signal sent from the UE to the base station.

Clause 5. The method of clause 1 or 2, wherein the first RF device is a first User Equipment (UE), wherein the second RF device is a second UE, and wherein the data communication signal is a sidelink signal sent between the first UE and the second UE.

Clause 6. The method of any of clauses 1-5, wherein a bandwidth of frequency resources allocated for transmission of the first radar signal is the same as a bandwidth of frequency resources allocated for transmission of the second radar signal.

Clause 7. The method of any of clauses 1-6, wherein the maintaining of phase continuity comprises preventing transmission by the first RF device over the entirety of the intervening time period, and wherein the engaging in data communication with the second RF device involves receiving the data communication signal from the second RF device during the intervening time period.

Clause 8. The method of any of clauses 1-6, wherein the maintaining of phase continuity comprises performing RF tuning during a tuning gap, after transmitting the data communication signal to the second RF device and before transmitting the second radar signal.

Clause 9. The method of clause 8, wherein the first RF device is a User Equipment (UE), and wherein a minimum duration of the tuning gap is communicated to the UE from a base station.

Clause 10. The method of clause 8 or 9, further comprising: storing a phase configuration associated with an end of the first radar signal; and restoring the phase configuration during the tuning gap in preparation for transmitting the second radar signal.

Clause 11. The method of clause 10, wherein the phase configuration includes an operating state of a power amplifier that amplified the first radar signal for transmission.

Clause 12. The method of any of clauses 1-11, wherein the first radar signal, the second radar signal, and the data communication signal are each transmitted using orthogonal frequency-division multiplexing (OFDM), and wherein a duration of at least a portion of the intervening time period is defined in terms of a number of OFDM symbols.

Clause 13. The method of any of clauses 1-12, wherein the carrier frequency corresponds to one of a plurality of subcarriers over which the first radar signal and the second radar signal are transmitted in sequence, the method further comprising: maintaining, by the first RF device, phase continuity between the first radar signal and the second radar signal for each subcarrier separately.

Clause 14. A first radio frequency (RF) device comprising: a transceiver configured to transmit a first radar signal and a second radar signal in sequence using a same carrier frequency, wherein the first radar signal and the second radar signal or echoes of the first radar signal and the second radar signal are processed together to determine an attribute of a radar target; and one or more processing units communicatively coupled to the transceiver, the one or more processing units configured to: engage in data communication with a second RF device through the transceiver and during an intervening time period between the first radar signal and the second radar signal, wherein the data communication with the second RF device involves transmitting a data communication signal to the second RF device or receiving the data communication signal from the second RF device, and maintain phase continuity between the first radar signal and the second radar signal, wherein to maintain phase continuity, the one or more processing units are configured to: (i) perform RF tuning on the transceiver after the transceiver transmits the data communication signal to the second RF device and before the transceiver transmits the second radar signal, or (ii) prevent transmission by the transceiver over an entirety of the intervening time period.

Clause 15. The first RF device of clause 14, wherein the first RF device and the second RF device form a bistatic or multistatic radar system.

Clause 16. The first RF device of clause 14 or 15, wherein the first RF device is a base station, wherein the second RF device is a User Equipment (UE), and wherein the data communication signal is a downlink signal sent from the base station to the UE.

Clause 17. The first RF device of clause 14 or 15, wherein the first RF device is a User Equipment (UE), wherein the second RF device is a base station, and wherein the data communication signal is an uplink signal sent from the UE to the base station.

Clause 18. The first RF device of clause 14 or 15, wherein the first RF device is a first User Equipment (UE), wherein the second RF device is a second UE, and wherein the data communication signal is a sidelink signal sent between the first UE and the second UE.

Clause 19. The first RF device of any of clauses 14-18, wherein a bandwidth of frequency resources allocated for transmission of the first radar signal is the same as a bandwidth of frequency resources allocated for transmission of the second radar signal.

Clause 20. The first RF device of any of clauses 14-19, wherein: to maintain phase continuity, the one or more processing units are configured to prevent transmission by the transceiver over the entirety of the intervening time period; and to engage in data communication with the second RF device, the one or more processing units are configured to receive, through the transceiver, the data communication signal from the second RF device during the intervening time period.

Clause 21. The first RF device of any of clauses 14-19, wherein to maintain phase continuity, the one or more processing units are configured to perform RF tuning on the transceiver during a tuning gap, after the transceiver transmits the data communication signal to the second RF device and before the transceiver transmits the second radar signal.

Clause 22. The first RF device of clause 21, wherein the first RF device is a User Equipment (UE), and wherein a minimum duration of the tuning gap is communicated to the UE from a base station.

Clause 23. The first RF device of clause 21 or 22, wherein the one or more processing units are further configured to: store a phase configuration associated with an end of the first radar signal; and restore the phase configuration during the tuning gap in preparation for transmitting the second radar signal.

Clause 24. The first RF device of clause 23, wherein the phase configuration includes an operating state of a power amplifier that amplified the first radar signal for transmission.

Clause 25. The first RF device of any of clauses 14-24, wherein the first radar signal, the second radar signal, and the data communication signal are each transmitted using orthogonal frequency-division multiplexing (OFDM), and wherein a duration of at least a portion of the intervening time period is defined in terms of a number of OFDM symbols.

Clause 26. The first RF device of any of clauses 14-25, wherein the carrier frequency corresponds to one of a plurality of subcarriers over which the first radar signal and the second radar signal are transmitted in sequence, and wherein the one or more processing units are configured to maintain phase continuity between the first radar signal and the second radar signal for each subcarrier separately.

Clause 27. A non-transitory computer-readable medium having instructions stored thereon, wherein the instructions, when executed by one or more processing units of a first RF device, cause the first RF device to perform functions comprising: transmitting a first radar signal and a second radar signal in sequence using a same carrier frequency, wherein the first radar signal and the second radar signal or echoes of the first radar signal and the second radar signal are processed together to determine an attribute of a radar target; engaging in data communication with a second RF device during an intervening time period between the first radar signal and the second radar signal, wherein the engaging in data communication with the second RF device involves transmitting a data communication signal to the second RF device or receiving the data communication signal from the second RF device; and maintaining phase continuity between the first radar signal and the second radar signal, wherein the maintaining of phase continuity comprises: (i) performing RF tuning after transmitting the data communication signal to the second RF device and before transmitting the second radar signal, or (ii) preventing transmission by the first RF device over an entirety of the intervening time period.

Clause 28. The non-transitory computer-readable medium of clause 27, wherein the maintaining of phase continuity comprises: storing a phase configuration, the phase configuration including an operating state of a power amplifier of the first RF device during an end of the first radar signal; and restoring the phase configuration during a tuning gap in preparation for transmitting the second radar signal, the tuning gap occurring after transmitting the data communication signal to the second RF device.

Clause 29. A device comprising: a transceiver configured to transmit a first radar signal and a second radar signal in sequence using a same carrier frequency, wherein the first radar signal and the second radar signal or echoes of the first radar signal and the second radar signal are processed together to determine an attribute of a radar target; means for configuring the transceiver to engage in data communication with a second device during an intervening time period between the first radar signal and the second radar signal, wherein the data communication with the second device involves transmitting a data communication signal to the second device or receiving the data communication signal from the second device; and means for maintaining phase continuity between the first radar signal and the second radar signal based on: (i) performing RF tuning on the transceiver after the transceiver transmits the data communication signal to the second device and before the transceiver transmits the second radar signal, or (ii) preventing transmission by the transceiver over an entirety of the intervening time period.

Clause 30. The device of clause 29, wherein the means for maintaining phase continuity between the first radar signal and the second radar signal is configured to: store a phase configuration, the phase configuration including an operating state of a power amplifier of the transceiver during an end of the first radar signal; and restore the phase configuration during a tuning gap in preparation for transmitting the second radar signal, the tuning gap occurring after the transceiver transmits the data communication signal to the second device.

What is claimed is:

1. A method comprising, by a first radio frequency (RF) device:

transmitting a first radar signal and a second radar signal in sequence using a same carrier frequency, wherein the first radar signal and the second radar signal or echoes of the first radar signal and the second radar signal are processed together to determine an attribute of a radar target;

engaging in data communication with a second RF device during an intervening time period between the first radar signal and the second radar signal, wherein the engaging in data communication with the second RF device involves transmitting a data communication signal to the second RF device or receiving the data communication signal from the second RF device; and maintaining phase continuity between the first radar signal and the second radar signal, wherein the maintaining of phase continuity comprises: (i) performing RF tuning after transmitting the data communication signal to the second RF device and before transmitting the second radar signal, or (ii) refraining transmission by the first RF device over an entirety of the intervening time period.

2. The method of claim 1, wherein the first RF device and the second RF device form a bistatic or multistatic radar system.

3. The method of claim 1, wherein the first RF device is a base station, wherein the second RF device is a User Equipment (UE), and wherein the data communication signal is a downlink signal sent from the base station to the UE.

4. The method of claim 1, wherein the first RF device is a User Equipment (UE), wherein the second RF device is a base station, and wherein the data communication signal is an uplink signal sent from the UE to the base station.

5. The method of claim 1, wherein the first RF device is a first User Equipment (UE), wherein the second RF device is a second UE, and wherein the data communication signal is a sidelink signal sent between the first UE and the second UE.

6. The method of claim 1, wherein a bandwidth of frequency resources allocated for transmission of the first radar signal is the same as a bandwidth of frequency resources allocated for transmission of the second radar signal.

7. The method of claim 1, wherein the maintaining of phase continuity comprises preventing transmission by the first RF device over the entirety of the intervening time period, and wherein the engaging in data communication with the second RF device involves receiving the data communication signal from the second RF device during the intervening time period.

8. The method of claim 1, wherein the maintaining of phase continuity comprises performing RF tuning during a tuning gap, after transmitting the data communication signal to the second RF device and before transmitting the second radar signal.

9. The method of claim 8, wherein the first RF device is a User Equipment (UE), and wherein a minimum duration of the tuning gap is communicated to the UE from a base station.

10. The method of claim 8, further comprising:

storing a phase configuration associated with an end of the first radar signal; and restoring the phase configuration during the tuning gap in preparation for transmitting the second radar signal.

11. The method of claim 10, wherein the phase configuration includes an operating state of a power amplifier that amplified the first radar signal for transmission.

12. The method of claim 1, wherein the first radar signal, the second radar signal, and the data communication signal are each transmitted using orthogonal frequency-division multiplexing (OFDM), and wherein a duration of at least a portion of the intervening time period is defined in terms of a number of OFDM symbols.

13. The method of claim 1, wherein the carrier frequency corresponds to one of a plurality of subcarriers over which the first radar signal and the second radar signal are transmitted in sequence, the method further comprising:

maintaining, by the first RF device, phase continuity between the first radar signal and the second radar signal for each subcarrier separately.

14. A first radio frequency (RF) device comprising:

a transceiver configured to transmit a first radar signal and a second radar signal in sequence using a same carrier frequency, wherein the first radar signal and the second radar signal or echoes of the first radar signal and the second radar signal are processed together to determine an attribute of a radar target; and one or more processing units communicatively coupled to the transceiver, the one or more processing units configured to:

engage in data communication with a second RF device through the transceiver and during an intervening time period between the first radar signal and the second radar signal, wherein the data communication with the second RF device involves transmitting a data communication signal to the second RF device or receiving the data communication signal from the second RF device, and maintain phase continuity between the first radar signal and the second radar signal, wherein to maintain phase continuity, the one or more processing units are configured to: (i) perform RF tuning on the transceiver after the transceiver transmits the data communication signal to the second RF device and before the transceiver transmits the second radar signal, or (ii) prevent transmission by the transceiver over an entirety of the intervening time period.

15. The first RF device of claim 14, wherein the first RF device and the second RF device form a bistatic or multistatic radar system.

16. The first RF device of claim 14, wherein the first RF device is a base station, wherein the second RF device is a User Equipment (UE), and wherein the data communication signal is a downlink signal sent from the base station to the UE.

17. The first RF device of claim 14, wherein the first RF device is a User Equipment (UE), wherein the second RF device is a base station, and wherein the data communication signal is an uplink signal sent from the UE to the base station.

18. The first RF device of claim 14, wherein the first RF device is a first User Equipment (UE), wherein the second RF device is a second UE, and wherein the data communication signal is a sidelink signal sent between the first UE and the second UE.

19. The first RF device of claim 14, wherein a bandwidth of frequency resources allocated for transmission of the first radar signal is the same as a bandwidth of frequency resources allocated for transmission of the second radar signal.

20. The first RF device of claim 14, wherein:

to maintain phase continuity, the one or more processing units are configured to prevent transmission by the transceiver over the entirety of the intervening time period; and to engage in data communication with the second RF device, the one or more processing units are configured to receive, through the transceiver, the data communication signal from the second RF device during the intervening time period.

21. The first RF device of claim 14, wherein to maintain phase continuity, the one or more processing units are configured to perform RF tuning on the transceiver during a tuning gap, after the transceiver transmits the data communication signal to the second RF device and before the transceiver transmits the second radar signal.

22. The first RF device of claim 21, wherein the first RF device is a User Equipment (UE), and wherein a minimum duration of the tuning gap is communicated to the UE from a base station.

23. The first RF device of claim 21, wherein the one or more processing units are further configured to:

store a phase configuration associated with an end of the first radar signal; and restore the phase configuration during the tuning gap in preparation for transmitting the second radar signal.

24. The first RF device of claim 23, wherein the phase configuration includes an operating state of a power amplifier that amplified the first radar signal for transmission.

25. The first RF device of claim 14, wherein the first radar signal, the second radar signal, and the data communication signal are each transmitted using orthogonal frequency-division multiplexing (OFDM), and wherein a duration of at least a portion of the intervening time period is defined in terms of a number of OFDM symbols.

26. The first RF device of claim 14, wherein the carrier frequency corresponds to one of a plurality of subcarriers over which the first radar signal and the second radar signal are transmitted in sequence, and wherein the one or more processing units are configured to maintain phase continuity between the first radar signal and the second radar signal for each subcarrier separately.

27. A non-transitory computer-readable medium having instructions stored thereon, wherein the instructions, when executed by one or more processing units of a first RF device, cause the first RF device to perform functions comprising:

transmitting a first radar signal and a second radar signal in sequence using a same carrier frequency, wherein the first radar signal and the second radar signal or echoes of the first radar signal and the second radar signal are processed together to determine an attribute of a radar target;

engaging in data communication with a second RF device during an intervening time period between the first radar signal and the second radar signal, wherein the engaging in data communication with the second RF device involves transmitting a data communication signal to the second RF device or receiving the data communication signal from the second RF device; and maintaining phase continuity between the first radar signal and the second radar signal, wherein the maintaining of phase continuity comprises: (i) performing RF tuning after transmitting the data communication signal to the second RF device and before transmitting the second radar signal, or (ii) preventing transmission by the first RF device over an entirety of the intervening time period.

28. The non-transitory computer-readable medium of claim 27, wherein the maintaining of phase continuity comprises:

storing a phase configuration, the phase configuration including an operating state of a power amplifier of the first RF device during an end of the first radar signal; and restoring the phase configuration during a tuning gap in preparation for transmitting the second radar signal, the tuning gap occurring after transmitting the data communication signal to the second RF device.

29. A device comprising:

a transceiver configured to transmit a first radar signal and a second radar signal in sequence using a same carrier frequency, wherein the first radar signal and the second radar signal or echoes of the first radar signal and the second radar signal are processed together to determine an attribute of a radar target;

means for configuring the transceiver to engage in data communication with a second device during an intervening time period between the first radar signal and the second radar signal, wherein the data communication with the second device involves transmitting a data communication signal to the second device or receiving the data communication signal from the second device; and means for maintaining phase continuity between the first radar signal and the second radar signal based on: (i) performing RF tuning on the transceiver after the transceiver transmits the data communication signal to the second device and before the transceiver transmits the second radar signal, or (ii) preventing transmission by the transceiver over an entirety of the intervening time period.

30. The device of claim 29, wherein the means for maintaining phase continuity between the first radar signal and the second radar signal is configured to:

store a phase configuration, the phase configuration including an operating state of a power amplifier of the transceiver during an end of the first radar signal; and restore the phase configuration during a tuning gap in preparation for transmitting the second radar signal, the tuning gap occurring after the transceiver transmits the data communication signal to the second device.

* * * * *